US009025198B2

(12) United States Patent
Wada

(10) Patent No.: US 9,025,198 B2
(45) Date of Patent: May 5, 2015

(54) IMAGE FORMING APPARATUS AND IMAGE FORMING METHOD

(75) Inventor: Yuji Wada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 409 days.

(21) Appl. No.: 13/040,894

(22) Filed: Mar. 4, 2011

(65) Prior Publication Data

US 2011/0222128 A1 Sep. 15, 2011

(30) Foreign Application Priority Data

Mar. 12, 2010 (JP) ................................ 2010-056743
Jul. 30, 2010 (JP) ................................ 2010-172390

(51) Int. Cl.

| | |
|---|---|
| ***H04N 1/60*** | (2006.01) |
| ***H04N 1/407*** | (2006.01) |
| ***H04N 1/409*** | (2006.01) |
| ***G03G 15/01*** | (2006.01) |
| ***G03G 15/16*** | (2006.01) |
| *G03G 15/00* | (2006.01) |

(52) U.S. Cl.

CPC ........ *G03G 15/0131* (2013.01); *G03G 15/5037* (2013.01); *G03G 15/5041* (2013.01); *G03G 15/1605* (2013.01); *G03G 15/1675* (2013.01); *G03G 15/5025* (2013.01)

(58) Field of Classification Search

CPC .............. G03G 15/50; G03G 15/5025; G03G 15/5033; G03G 15/5037; G03G 15/5041; G03G 15/5054; G03G 15/5058

USPC ......................... 358/1.9, 3.26–3.27, 518–520

See application file for complete search history.

(56) References Cited

U.S. PATENT DOCUMENTS

| | | | | |
|---|---|---|---|---|
| 5,614,936 | A * | 3/1997 | Takahashi | 347/240 |
| 5,950,042 | A * | 9/1999 | Goto et al. | 399/53 |
| 7,400,840 | B2 * | 7/2008 | Hattori | 399/49 |
| 7,706,031 | B2 * | 4/2010 | Viturro et al. | 358/504 |
| 7,789,478 | B2 * | 9/2010 | Nakano et al. | 347/19 |
| 8,104,857 | B2 * | 1/2012 | Takahashi et al. | 347/14 |
| 8,197,025 | B2 * | 6/2012 | Moriya | 347/19 |
| 8,358,438 | B2 * | 1/2013 | Jackson et al. | 358/1.9 |
| 2004/0246545 | A1 * | 12/2004 | Touura | 358/521 |
| 2007/0286622 | A1 * | 12/2007 | Morikuni | 399/49 |
| 2008/0088883 | A1 * | 4/2008 | Yoshida | 358/300 |

(Continued)

FOREIGN PATENT DOCUMENTS

| | | |
|---|---|---|
| JP | 5-273874 A | 10/1993 |
| JP | 9-134045 | 5/1997 |

(Continued)

OTHER PUBLICATIONS

Japanese Office Action issued Mar. 4, 2014 in Patent Application No. 2010-172390.

*Primary Examiner* — Richard Zhu

(74) *Attorney, Agent, or Firm* — Oblon, McClelland, Maier & Neustadt, L.L.P.

(57) ABSTRACT

An image forming apparatus includes a base value setting unit and a correction value calculating unit. The base value setting unit sets a base value of an image process condition on the basis of the area ratio of an image to be formed. The correction value calculating unit calculates a correction value obtained by correcting the base value set by the base value setting unit on the basis of at least the pattern of the image. The image is formed based on the correction value calculated by the correction value calculating unit.

16 Claims, 16 Drawing Sheets

(56) References Cited

U.S. PATENT DOCUMENTS

| | | | | |
|---|---|---|---|---|
| 2008/0218778 | A1* | 9/2008 | Kusunoki | 358/1.9 |
| 2008/0292370 | A1* | 11/2008 | Murayama | 399/301 |
| 2009/0103115 | A1* | 4/2009 | Takaki | 358/1.8 |
| 2009/0213431 | A1* | 8/2009 | Miyamoto | 358/3.03 |
| 2009/0244566 | A1* | 10/2009 | Jackson et al. | 358/1.9 |
| 2010/0046035 | A1* | 2/2010 | Kinoshita | 358/3.06 |
| 2010/0202005 | A1* | 8/2010 | Viturro et al. | 358/1.9 |
| 2010/0290798 | A1* | 11/2010 | Nakane | 399/39 |
| 2011/0013920 | A1 | 1/2011 | Wada | |

FOREIGN PATENT DOCUMENTS

| | | | |
|---|---|---|---|
| JP | 10-254258 | | 9/1998 |
| JP | 3244086 | | 10/2001 |
| JP | 2001-331005 | | 11/2001 |
| JP | 2003-186284 | A | 7/2003 |
| JP | 2004-29514 | | 1/2004 |
| JP | 2006-98473 | | 4/2006 |
| JP | 2006-227393 | A | 8/2006 |
| JP | 2009-168906 | | 7/2009 |

* cited by examiner

| ENVIRONMENTAL CLASSIFICATION NAME | CLASSIFICATION BASED ON ABSOLUTE HUMIDITY |
|---|---|
| LL | ABSOLUTE HUMIDITY ≤ 2.0 |
| ML | 2.0 < ABSOLUTE HUMIDITY ≤ 4.0 |
| MM | 4.0 < ABSOLUTE HUMIDITY ≤ 10.0 |
| MH | 10.0 < ABSOLUTE HUMIDITY ≤ 18.0 |
| HH | 18.0 < ABSOLUTE HUMIDITY |

| ENVIRONMENTAL CLASSIFICATION | LINE CORRECTION COEFFICIENT |
|---|---|
| LL | 1.8 |
| ML | 1.6 |
| MM | 1.4 |
| MH | 1.1 |
| HH | 1.1 |

IMAGE FORMING APPARATUS AND IMAGE FORMING METHOD

CROSS-REFERENCE TO RELATED APPLICATIONS

The present application claims priority to and incorporates by reference the entire contents of Japanese Patent Application No. 2010-056743 filed in Japan on Mar. 12, 2010 and Japanese Patent Application No. 2010-172390 filed in Japan on Jul. 30, 2010.

BACKGROUND OF THE INVENTION

1. Field of the Invention

The present invention relates to an image forming apparatus and an image forming method.

2. Description of the Related Art

In recent years, an image forming apparatus, such as a copier, a facsimile machine, or a printer, and an image forming method have been proposed which adjust image process conditions, such as a transfer current, according to an image area ratio to form a high-quality image (for example, see Japanese Patent Application Laid-open No. 2001-331005, Japanese Patent Application Laid-open No. 2009-168906, and Japanese Patent Application Laid-open No. 2004-29514). In addition, for example, image forming apparatuses have been proposed which adjust the image process conditions according to various conditions (for example, see Japanese Patent Application Laid-open No. 2001-331005, Japanese Patent Application Laid-open No. 2009-168906, Japanese Patent Application Laid-open No. 2004-29514, Japanese Patent Application Laid-open No. 5-273874, Japanese Patent Application Laid-open No. 9-134045, Japanese Patent Application Laid-open No. 2006-98473, and Japanese Patent Application Laid-open No. 10-254258).

However, as a result of examination, the inventors found that in some cases, with a technique for adjusting the image process conditions, such as a transfer current, according to the image area ratio on the basis of the pattern of an image to be formed, for example, on the basis of whether the image was a solid image or a linear image, image quality became unstable. It is considered that an unstable image quality is caused by a variation in the amount of toner forming an image depending on whether the image is a solid image or a linear image.

SUMMARY OF THE INVENTION

It is an object of the present invention to at least partially solve the problems in the conventional technology.

According to an aspect of the present invention, an image forming apparatus includes a base value setting unit and a correction value calculating unit. The base value setting unit sets a base value of an image process condition based on an area ratio of an image to be formed. The correction value calculating unit calculates a correction value obtained by correcting the base value set by the base value setting unit based on at least the pattern of the image. The image is formed based on the correction value calculated by the correction value calculating unit.

According to another aspect of the present invention, there is provided an image forming method including: setting, by a base value setting unit, a base value of an image process condition based on an area ratio of an image to be formed; and calculating, by a correction value calculating unit, a correction value obtained by correcting the base value set at the setting based on at least a pattern of the image. The image is formed based on the correction value calculated at the calculating.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings.

Figure 1:
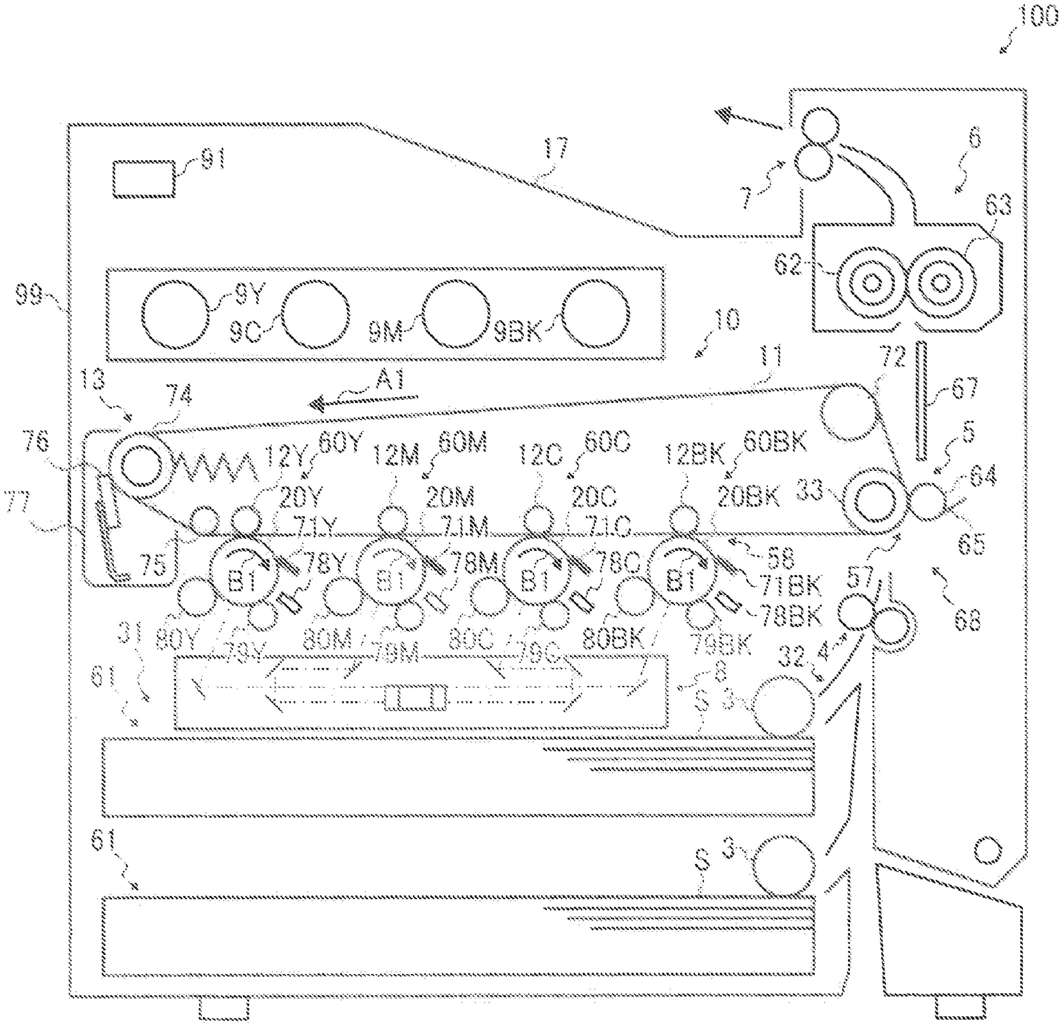
FIG. 1 is a front view schematically illustrating the structure of an image forming apparatus according to an embodiment.

FIG. 1 schematically shows an image forming apparatus 100 according to an embodiment. While the image forming apparatus 100 will be described by way of example as a color laser printer, it may be any other image forming apparatus, such as a printer of another type, a facsimile machine, a copier, a printing press, or a multifunctional product (MFP) having the functions of, for example, a copier and a printer. An image forming apparatus 100 forms an image on the basis of an image signal corresponding to image information received from the outside. The image forming apparatus 100 can form images on a sheet recording medium, examples of which include plain paper generally used in a copier, an OHP sheet, heavy paper, such as a card or a postcard, and an envelope.

The image forming apparatus 100 has a tandem structure in which photosensitive drums 20Y, 20M, 20C, 20BK, which are latent image carriers serving as first image carriers that have toner, which is an image forming material, carried thereon and can form images corresponding to yellow, magenta, cyan, and black separated by color separation with the toner are arranged in parallel. That is, the image forming apparatus 100 is a tandem color laser printer.

The photosensitive drums 20Y, 20M, 20C, and 20BK, which are surface moving members, are arranged in this order from the upstream side in the direction of an arrow A1, which is the counterclockwise direction in FIG. 1 and is the moving direction of an endless transfer belt 11. The endless transfer belt 11 is an intermediate transfer body serving as a second image carrier that is rotatably supported by a frame (not shown) of a body 99 of the image forming apparatus 100. Characters Y, M, C, BK, and K attached to the rear sides of the reference numerals of each member indicate yellow, magenta, cyan, and black.

The photosensitive drums 20Y, 20M, 20C, and 20BK are included in image forming units 60Y, 60M, 60C, and 60BK for forming yellow (Y), magenta (M), cyan (C), and black (BK or K) images, respectively.

The photosensitive drums 20Y, 20M, 20C, and 20BK are arranged on an outer circumferential surface, i.e., an image forming surface of the endless transfer belt 11 which is provided substantially at the center of the body 99.

The transfer belt 11 can be moved in the direction of the arrow A1 while facing each of the photosensitive drums 20Y, 20M, 20C, and 20BK. Visible images, i.e., toner images formed on the photosensitive drums 20Y, 20M, 20C, and 20BK are transferred to the transfer belt 11 moved in the direction of the arrow A1 to be superimposed on each other. Then, the toner images are collectively transferred to a transfer sheet S, which is a recording medium. Therefore, the image forming apparatus 100 is an intermediate transfer type, i.e., an indirect transfer type. The image forming apparatus 100 is a tandem indirect transfer type.

The transfer belt 11 has a lower portion facing each of the photosensitive drums 20Y, 20M, 20C, and 20BK. The portion facing the photosensitive drums forms a primary transfer portion 58 that transfers the toner image on each of the photosensitive drums 20Y, 20M, 20C, and 20BK to the transfer belt 11.

The superimposed transfer of the images to the transfer belt 11 is performed by applying a voltage to primary transfer rollers 12Y, 12M, 12C, and 12BK which are provided to respectively face the photosensitive drums 20Y, 20M, 20C, and 20BK with the transfer belt 11 interposed therebetween such that the toner images formed on the photosensitive drums 20Y, 20M, 20C, and 20BK are transferred to be superimposed at the same position on the transfer belt 11 at different timings from the upstream side to the downstream side of the direction of the arrow A1 during the movement of the transfer belt 11 in the direction of the arrow A1.

The transfer belt 11 has a multi-layer structure in which a base layer is made of a material with a low extension ratio and a coating layer made of a material with high flatness is formed on the surface of the base layer. The base layer may be made of, for example, a fluorine resin, a PVDF sheet, or a polyimide-based resin. In this embodiment, the base layer is made of polyimide. The coating layer may be made of, for example, a fluorine-based resin.

The transfer belt 11 includes skew preventing guides (not shown) as skew preventing members at each edge. The skew preventing guide is provided to prevent the deviation of the transfer belt 11 in the width direction vertical to the plane of the paper of FIG. 1 which corresponds to the main scanning direction when the transfer belt 11 is rotated in the direction of the arrow A1. The skew preventing guide is made of urethane rubber. However, the skew preventing guide may be made of various kinds of rubber materials such as silicon rubber.

The transfer belt 11 has a width corresponding to the length of an A4 transfer sheet S in the width direction. Therefore, the image forming apparatus 100 can form an image on the transfer sheet S with a maximum of A3 size.

The body 99 of the image forming apparatus 100 includes four image forming units 60Y, 60M, 60C, and 60BK, a transfer belt unit 10 that serves as an intermediate transfer unit including the transfer belt 11 and is provided above the photosensitive drums 20Y, 20M, 20C, and 20BK to face the photosensitive drums, a secondary transfer device 5 that is provided on the right side of the transfer belt 11 in FIG. 1 to face the transfer belt 11, and an optical scanning device 8 which is an exposure device, i.e., an optical writing unit serving as a latent image forming unit that is provided, below the image forming units 60Y, 60M, 60C, and 60BK to face the image forming units.

The body 99 of the image forming apparatus 100 further includes a feed device 61 serving as a feed cassette capable of storing a large number of transfer sheets S transported to a secondary transfer portion 57 between the transfer belt 11 and the secondary transfer device 5, a pair registration rollers 4 that feeds the recording sheet S transported from the feed device 61 to the secondary transfer portion 57 at a predetermined timing when the image forming units 60Y, 60M, 60C, and 60BK form toner images, and a sensor (not shown) that detects the arrival of the leading end of the transfer sheet S to the registration rollers 4.

The body 99 of the image forming apparatus 100 further includes a fixing device 6 serving as a roller-fixing-type fixing unit that fixes the toner image to the transfer sheet S having the toner image transferred thereto, a pair of discharge rollers 7 that discharges a printout, which is the transfer sheet S having the toner image fixed thereto, to the outside of the body 99, a guide member 67 that forms a recording medium transport path which guides the transfer sheet S passing through the secondary transfer portion 57 to the fixing device 6, toner bottles 9Y, 9M, 9C, and 9BK that are provided above the transfer belt unit 10 and are respectively filled up with yellow, cyan, magenta, and black toners, and a discharge tray 17 which is provided at the upper part of the body 99 and on which the transfer sheet S discharged to the outside of the body 99 by the discharge rollers 7 is loaded.

Figure 2:
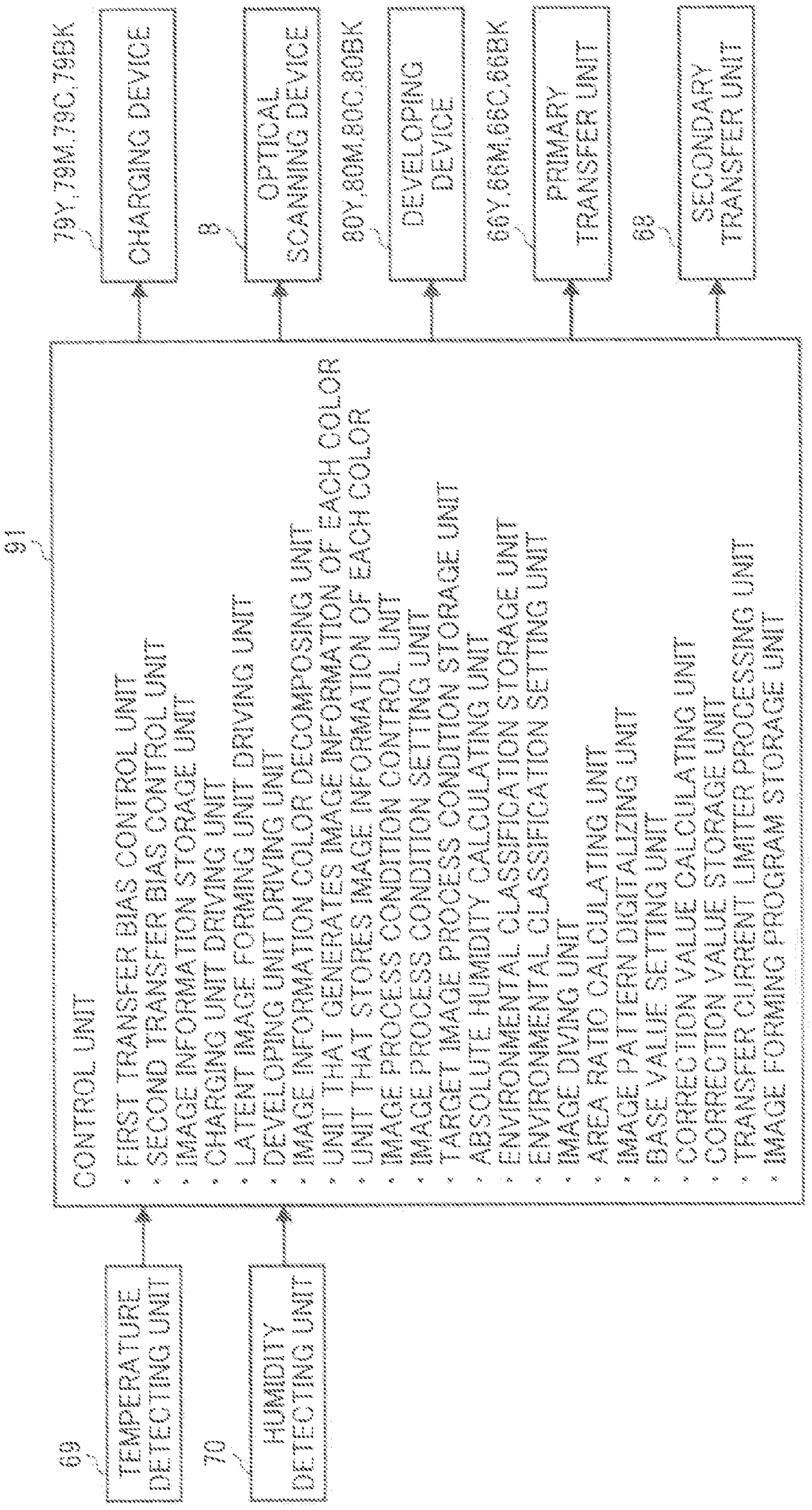
FIG. 2 is a block diagram illustrating a portion of a control system of the image forming apparatus shown in FIG. 1.

The body 99 of the image forming apparatus 100 further includes a driving device (not shown) that rotates each of the photosensitive drums 20Y, 20M, 20C, and 20BK, a CPU (not shown) that controls the overall operation of the image forming apparatus 100, a control unit 91 including, for example, a memory, and a temperature detecting unit 69, which is a temperature sensor, and a humidity detecting unit 70, which is a humidity sensor, that serve as an environment detecting unit detecting the usage environment of the image forming apparatus 100. The temperature detecting unit 69 and the humidity detecting unit 70 are shown in FIG. 2.

The transfer belt unit 10 includes, in addition to the transfer belt 11, primary transfer rollers 12Y, 12M, 12C, and 12BK serving as primary transfer bias rollers, a driving roller 72 which is a driving member, a cleaning opposite roller 74 which is a tension roller, tension rollers 75 and 33 serving as supporting rollers that stretch the transfer belt 11 together with the driving roller 72 and the cleaning opposite roller 74, and a cleaning device 13 serving as a belt cleaning device, which is an intermediate transfer body cleaning device that is provided to face the transfer belt 11 and cleans the surface of the transfer belt 11. The transfer belt 11 is wound around the rollers 72, 74, 75, and 33.

The transfer belt unit 10 further includes a driving system (not shown) that includes a driving motor (not shown) for rotating the driving roller 72, power supplies (not shown) serving as first transfer bias applying units that apply a primary transfer bias to each of the primary transfer rollers 12Y, 12M, 12C, and 12BK, and a first transfer bias control unit that is implemented as one function of the control unit 91. The primary transfer rollers 12Y, 12M, 12C, and 12BK and the power supplies form primary transfer units 66Y, 66M, 66C, and 66BK shown in FIG. 2.

The driving roller 72, the cleaning opposite roller 74, and the tension rollers 75 and 33 are supporting rollers that support the transfer belt 11 to be rotatable. The cleaning opposite roller 74 and the tension rollers 75 and 33 are driven rollers that are rotated with the rotation of the transfer belt 11 by the driving roller 72. The primary transfer rollers 12Y, 12M, 12C, and 12BK press the rear surface of the transfer belt 11 against the photosensitive drums 20Y, 20M, 20C, and 20BK to form primary transfer nips. The primary transfer nips are formed in a portion of the transfer belt 11 between the tension rollers 75 and 33. The tension rollers 75 and 33 have a function of stabilizing the primary transfer nips.

A primary transfer electric field is formed at each of the primary transfer nips between the photosensitive drums 20Y, 20M, 20C, and 20BK and the primary transfer rollers 12Y, 12M, 12C, and 12BK by the influence of the primary transfer bias. The toner images of each color formed on the photosensitive drums 20Y, 20M, 20C, and 20BK are primarily transferred to the transfer belt 11 by the influence of the primary transfer electric field or nip pressure.

The tension roller 33 comes into contact with the secondary transfer device 5 with the transfer belt 11 interposed therebetween to form the secondary transfer portion 57. Therefore, the tension roller 33 also serves as a secondary transfer opposite roller.

The cleaning opposite roller 74 has the function of a tension roller serving as a pressure member that applies a predetermined tensile force suitable for transfer to the transfer belt 11.

The life span of the transfer belt 11 is about an integer multiple of the life span of the photosensitive drums 20Y, 20M, 20C, and 20BK. During the replacement of the transfer belt 11 due to the end of the life span thereof, when the photosensitive drums 20Y, 20M, 20C, and 20BK come to the end of the life span, the photosensitive drums 20Y, 20M, 20C, and 20BK are also replaced. As such, when the life span of the transfer belt 11 is about an integer multiple of the life span of the photosensitive drums 20Y, 20M, 20C, and 20BK, it is possible to replace the transfer belt 11 and the photosensitive drums 20Y, 20M, 20C, and 20BK at the same time and improve maintenance. In addition, it is possible to suppress or prevent a reduction in the transfer rate and the occurrence of a void image due to an increase in the friction coefficients of the photosensitive drums 20Y, 20M, 20C, and 20BK when the photosensitive drums 20Y, 20M, 20C, and 20BK coming to the end of the life span are left without being replaced.

However, in a case in which the life span of the transfer belt 11 is not about an integer multiple of the life span of the photosensitive drums 20Y, 20M, 200, and 20BK, during the replacement of the transfer belt 11 due to the end of the life span thereof, when the photosensitive drums 20Y, 20M, 20C, and 20BK come to the end of the life span or when the photosensitive drums 20Y, 20M, 20C, and 203K are close to the end of the life, the photosensitive drums 20Y, 20M, 20C, and 20BK may also be replaced. In this case, similarly, it is possible to improve maintenance and suppress or prevent a reduction in the transfer rate and the occurrence of a void image.

The cleaning device 13 is arranged on the left side of the cleaning opposite roller 74 and the tension roller 75 in FIG. 1. The cleaning device 13 includes a cleaning blade 76 that is provided to come into contact with the transfer belt 11 at a position facing the cleaning opposite roller 74, i.e., on the downstream side of the secondary transfer portion 57 in the direction of the arrow A1 and the upstream side of the primary transfer portion 58, and a case 77 having the cleaning blade 76 provided therein.

The cleaning device 13 scrapes away a foreign material, such as toner remaining on the transfer belt 11, with the cleaning blade 76 to clean the transfer belt 11.

The feed device 61 stores a plurality of transfer sheets S as a bundle. Multi-stage feed devices 61 are provided below the optical scanning device 8 at the lower part of the body 99. In this embodiment, two-stage feed devices 61 are provided. The multi-stage feed devices 61 form a paper bank 31, which is a feed table, at the lower part of the body 99.

The feed device 61 includes a transport roller 3 serving as a feed roller that comes into pressure contact with the upper surface of the uppermost transfer sheet S. The transport roller 3 is rotated in the counterclockwise direction at a predetermined timing to separate the uppermost transfer sheet S one by one and transmits the transfer sheet S to the registration rollers 4. Therefore, the feed roller 3 also serves as a separation roller.

The transfer sheet S taken out from the feed device 61 reaches the registration rollers 4 through a feed path 32 and is nipped between the registration rollers 4.

The secondary transfer device 5 is provided to face the tension roller 33. The secondary transfer device 5 includes a secondary transfer roller 64 serving as a secondary transfer member that is provided to face the tension roller 33 with the transfer belt 11 interposed therebetween and can transfer the toner image on the transfer belt 11 to the transfer sheet S passing between the transfer belt 11 and the secondary transfer roller 64, a cleaning device 65 that cleans the secondary transfer roller 64, and a spring (not shown) serving as an urging member that urges the secondary transfer roller 64 against the tension roller 33.

The tension roller 33 is a secondary transfer opposite roller that is provided to face the secondary transfer roller 64 and is connected to a power supply (not shown) serving as a second transfer bias applying unit that applies a secondary transfer bias between the secondary transfer roller 64 and the tension roller 33 and a second transfer bias control unit that is implemented as one of the functions of the control unit 91. The secondary transfer roller 64, the cleaning device 65, the spring, the tension roller 33, and the power supply form a secondary transfer unit 68 shown in FIG. 2.

The power supply applies a bias with the same polarity as the charging polarity of toner forming the toner image carried on the transfer belt 11 to the tension roller 33. Therefore, the tension roller 33 receives the bias from the power supply and generates repulsive force to the toner image carried on the transfer belt 11. The repulsive force causes the toner image to be electrostatically transferred to the transfer sheet S. Therefore, the tension roller 33 also functions as a repulsive roller.

The power supply may apply a bias with a polarity different from the charging polarity of toner forming the toner image carried on the transfer belt 11 to the secondary transfer roller 64 such that the tension roller 33 generates attractive force to the toner image carried on the transfer belt 11, which causes the toner image to be electrostatically transferred to the transfer sheet S. In this case, the secondary transfer roller 64 functions as an attractive roller. The tension roller 33 may be used as the repulsive roller and the secondary transfer roller 64 may be used as the attraction roller according to predetermined conditions.

The cleaning device 65 mainly includes a blade having a leading end that comes into contact with the secondary transfer roller 64, and removes a foreign material, such as paper powder or toner adhered to the secondary transfer roller 64, to clean the secondary transfer roller 64.

An endless secondary transfer belt serving as a transfer member may be used as the secondary transfer device 5 to have a sheet transport function of transporting the transfer sheet S having the toner image transferred thereto to the fixing device 6.

The fixing device 6 is provided above the secondary transfer device 5. The fixing device 6 includes a heating roller 62 serving as a fixing roller having a heat source therein and a pressure roller 63 that comes into pressure contact with the heating roller 62.

The fixing device 6 applies heat and pressure the transfer sheet S having the toner image carried thereon that passes through a fixing portion, which is a pressure contact portion between the heating roller 62 and the pressure roller 63, to fix the carried toner image to the surface of the transfer sheet S.

The yellow, cyan, magenta, and black toners in the toner bottles 9Y, 9M, 9C, and 9BK are polymerized toners in which a wax component is uniformly dispersed. When the yellow, cyan, magenta, and black toners are adhered to the transfer belt 11, a small amount of wax component is precipitated to the outside. A predetermined amount of each color toner is supplied to developing devices 80Y, 80M, 80C, and 80BK of the image forming units 60Y, 60M, 60C, and 60BK through a transport path (not shown).

The image forming units 60Y, 60M, 60C, and 60BK have the same structure. The image forming units 60Y, 60M, 60C, and 60BK include primary transfer rollers 12Y, 12M, 12C, and 12BK, cleaning devices 71Y, 71M, 71C, and 71BK serving as cleaning units, neutralization devices 78Y, 78M, 78C, and 78BK serving as neutralization units, charging devices 79Y, 79M, 79C, and 79BK serving as charging units for performing AC charging, the developing devices 80Y, 80M, 80C, 80BK serving as developing units that perform development with a two-component developer, and an image sensor (not shown) that detects the toner density of reference toner images formed on the photosensitive drums 20Y, 20M, 20C, and 20BK and the positions of lines during process control in the adjustment mode to correct the toner density and the positional deviation of the lines, which are arranged around the photosensitive drums 20Y, 20M, 20C, and 20BK in a rotational direction B1 which is the clockwise direction in FIG. 1.

In the image forming apparatus 100 having the above-mentioned structure, when a signal for forming a color image is input, the control unit 91 stores a print job including image information corresponding to an image to be formed in the memory and drives the driving roller 72. Then, the transfer belt 11, the cleaning opposite roller 74, and the tension rollers 75 and 33 are rotated and the photosensitive drums 20Y, 20M, 20C, and 20BK are rotated in the direction B1 with the rotation of the driving roller 72. The control unit 91 serves as an image information storage unit since it stores the image information in the memory.

The surfaces of the photosensitive drums 20Y, 20M, 200, and 20BK are uniformly charged by the charging devices 79Y, 79M, 79C, and 79BK with the rotation in the direction B1. The optical scanning device 8 emits a laser beam in the main scanning direction substantially aligned with a direction vertical to the plane of the paper of FIG. 1 to form electrostatic latent images corresponding to yellow, magenta, cyan, and black. The developing devices 80Y, 80M, 80C, and 80BK develop the electrostatic latent images with yellow, magenta, cyan, and black toners to form a single color image composed of magenta, cyan, and black toner images.

Therefore, the control unit 91 functions as a charging unit driving unit, a latent image forming unit driving unit, and a developing unit driving unit.

When driving the optical scanning device 8 to form electrostatic latent images corresponding to each color, the control unit 91 separates the image information stored in the memory into each color and drives the optical scanning device 8 on the basis of each color image information item, which is the separated image information of each color. Therefore, the control unit 91 functions as an image information color decomposing unit and a unit that generates image information of each color. In addition, the control unit 91 stores each color image information item generated by decomposing the image information into each color in the memory. Therefore, the control unit 91 functions as a unit that stores image information of each color.

The yellow, magenta, cyan, and black toner images obtained by development are sequentially primarily transferred to the same position on the transfer belt 11 that is rotated in the direction A1 by the primary transfer bias formed by the primary transfer rollers 12Y, 12M, 12C, and 12BK, and a combined color image is formed on the transfer belt 11.

With the input of the signal for forming a color image, any one of the feed devices 61 in the paper bank 31 is selected, and the transport roller 3 provided in the selected feed device 61 is rotated to take out the transfer sheet S, separates the transfer sheets one by one, and transports the transfer sheet into the feed path 32. The transfer sheet S transported into the feed path 32 is further transported by a transport roller (not shown) to collide with the registration rollers 4 and is then stopped.

The registration rollers 4 rotate when the combined color image superimposed on the transfer belt 11 is moved to the secondary transfer portion 57 with the rotation of the transfer belt 11 in the direction A1. In the secondary transfer portion 57, the combined color image comes into close contact with the transfer sheet S transported into the secondary transfer portion 57 and is then secondarily transferred to the transfer sheet S by the secondary transfer bias and the nip pressure. In this way, the color image is recorded on the transfer sheet S.

The transfer sheet S is transported to the fixing device 6 by the secondary transfer device 5. When the transfer sheet S passes through the fixing portion between the heating roller 62 and the pressure roller 63, the fixing device 6 applies heat and pressure to the transfer sheet S to fix the carried toner image, i.e., the combined color image.

The transfer sheet S having the combined color image fixed thereto by the fixing device 6 is discharged to the outside of the body 99 through the discharge roller 7 and is then stacked on the discharge tray 17 provided at the upper part of the body 99.

The toner that remains on the photosensitive drums 20Y, 20M, 20C, and 20BK after transfer is removed by the cleaning devices 71Y, 71M, 71C, and 71BK, and the neutralization devices 78Y, 78M, 78C, and 78BK neutralize the photosensitive drums 20Y, 20M, 20C, and 20BK. Then, the photosensitive drums 20Y, 20M, 20C, and 20BK are provided for the next charging operation of the charging devices 79Y, 79M, 79C, and 79BK.

The toner that remains on the surface of the transfer belt 11 passing through the secondary transfer portion 57 after the secondary transfer operation is removed by the cleaning blade 76 of the cleaning device 13 and the transfer belt 11 is cleaned and is ready for the next transfer operation.

The image forming apparatus 100 forms a reference toner image during process control, in addition to a general process of forming an image in response to instructions from the user. The process control is performed to correct a variation in an image forming performance due to a change of each unit of the image forming apparatus 100 over time, thereby forming a temporally uniform image, and adjust and control image process conditions.

The image process conditions include conditions that images are formed on the photosensitive drums 20Y, 20M, 20C, 20BK, i.e., image formation conditions, such as the charging potential of the photosensitive drums 20Y, 20M, 20C, and 20BK by the charging devices 79Y, 79M, 79C, and 79BK and the development bias of the developing devices 30Y, 80M, 80C, and 80BK, a development performance, such as toner density, the intensity of the laser beam emitted from the optical scanning device 8, i.e., the intensity of light for writing a latent image, and the potential of the image forming unit.

The image process conditions further include a primary transfer bias formed by the primary transfer units 66Y, 66M, 66C, and 66BK, a secondary transfer bias formed by the secondary transfer unit 68, a primary transfer current formed by the primary transfer units 66Y, 66M, 66C, and 66BK, and a secondary transfer current formed by the secondary transfer unit 68.

For example, the image process conditions are controlled such that image density is a target image density which is stored in the memory of the control unit 91 in advance, i.e., a target attachment amount serving as a reference image density. For the control of the image process conditions, the time when the image forming units 60Y, 60M, 60C, and 60BK form each color toner image is controlled to correct a variation in the formation positions of each color toner image by the image forming units 60Y, 60M, 60C, and 60BK to maintain a temporally uniform image formation position. The control is performed by the control unit 91. Therefore, the control unit 91 functions as an image process condition control unit and an image process condition setting unit. The control unit 91 and the memory function as a target image process condition storage unit.

The image forming units 60BK, 60Y, 60M, and 60C form each color reference toner image at predetermined positions on the photosensitive drums 20Y, 20M, 20C, and 20BK in the width direction or the direction B1 of the photosensitive drums 20Y, 20M, 20C, and 20BK to detect a variation in the image forming performance with respect to the image density and a variation in the image formation position in the process control mode, for example, when the image forming apparatus 100 is turned on or when a predetermined number of image forming operations end. The color reference toner images are detected by the image sensor. The control unit 91 counts the number of times an image is formed as the start condition of the process control.

The image forming apparatus 100 may adjust and control the image process conditions on the basis of the area ratio of an image to be formed, to stabilize image density to form a high-quality image even when the image is formed in response to instructions from the user during non-process control.

For example, a case in which transfer conditions, such as a transfer voltage and a transfer current, are adjusted as the image process conditions will be described below.

As an example of the above-mentioned case, the transfer current is changed depending on an image area ratio, i.e., a coverage rate in a direction perpendicular to the main scanning direction, i.e., the transport direction of the transfer sheet S.

The reason why the transfer current is changed depending on the area of the image is as follows. In the secondary transfer operation, when a discharge is considered in ideal conditions of constant current control, a current corresponding to the amount of charge of the toner flows. The image formed with toner has a charge corresponding to (the average charge of a grain of toner)×(the amount of toner), and the amount of toner is substantially determined by the height of toner, i.e., the thickness of a toner layer. For example, when yellow, magenta, cyan, and black toner images are laminated to form four toner layers, the thickness of the toner layers is simply four times more than the thickness of the toner layer of only the black toner image. However, strictly, the amount of toner also depends on density. When ideal development is performed, the height and density of toner are constant regardless of a pattern or arrangement. Therefore, considering only the image area, it is possible to perform a good transfer operation to obtain a transfer current for stabilizing image density. In the primary transfer operation, a flow of charge from toner occurs in an image portion and a flow of charge from the photosensitive drums 20Y, 20M, 20C, and 20BK to the transfer belt 11 occurs in a non-mage portion. Therefore, as the image area is reduced, the amount of current may increase in terms of the transfer rate. In the primary transfer operation, the ratio of the amount of charge flowing from the image portion to the amount of charge flowing from the non-mage portion is about 1:2 to 1:3. Therefore, in the secondary transfer operation, when the transfer belt 11 is not charged before the secondary transfer portion 57, charge does not flow from the transfer belt 11 to the transfer sheet S in the non-mage portion.

However, the inventors' study proved that, in some cases, even when the transfer current was determined by the area of the image on the basis of the pattern of the image, for example, whether the image was a solid image or a linear image, an unstable image quality was obtained. It is considered that the image quality is unstable since the amount of toner forming an image varies depending on whether the image is a solid image or a linear image.

Next, this will be described in detail with reference to FIG. 3.

Figure 3:
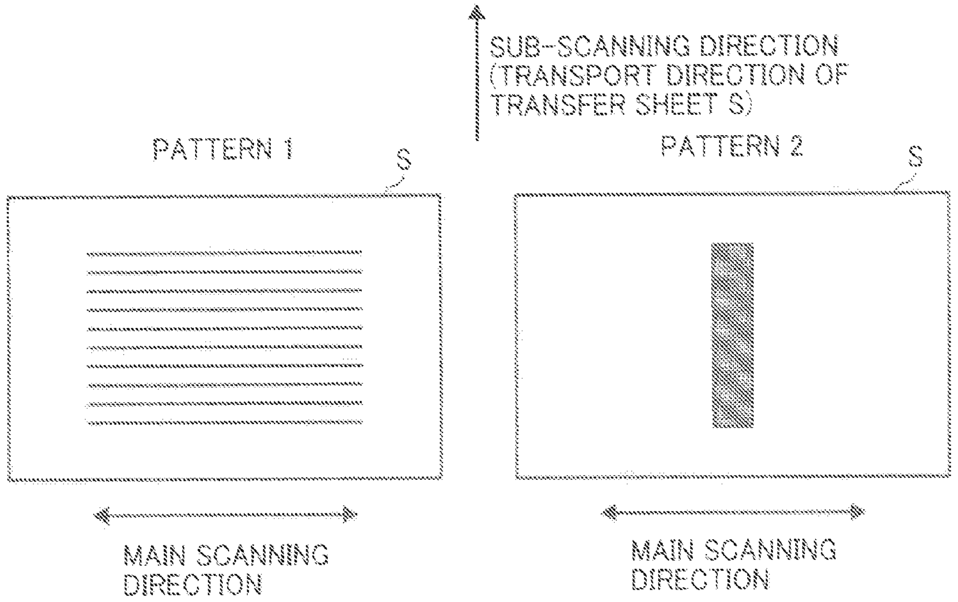
FIG. 3 is a plan view illustrating an example of images that have the same image area and different image patterns.

FIG. 3 shows an example of the transfer sheets that have the same image area, i.e., the same print area, and have different image patterns, specifically, different image distributions. The same print area means that, when an image to be formed is divided in the sub-scanning direction, the divided images have the same print area. In the example shown in FIG. 3, the print area of divided pieces of pattern 1 is equal to that of a divided piece of pattern 2. That is, the pattern 1 includes ten lines each having a length of 160 mm in the main scanning direction and a width of 500 μm in the sub-scanning direction, and the pattern 2 includes a strip having a length of 8 mm in the main scanning direction and a width of 100 mm in the sub-scanning direction. The strip is divided into ten pieces in the sub-scanning direction, i.e., the strip is divided such that one line is in each divided piece in the pattern 1. In the pattern 2, when division is performed at the same position in the sub-scanning direction, similar to the pattern 1, the print area of each divided piece is 80 $mm^2$ in both the pattern 1 and the pattern 2. Therefore, in the transfer current control based on only the print area, control is performed with the same transfer current in the pattern 1 and the pattern 2.

However, transfer current conditions corresponding to image qualities required for a line image, which is a linear image, and a solid image are different in the pattern 1 and the pattern 2. Therefore, it is preferable to change the transfer current in the pattern 1 and the pattern 2, to solve the quality problem. Actually, the two patterns have different optimal transfer currents. The reasons are as follows.

Reason 1: The amount of toner adhered to the image carrier and the recording medium is different in a line pattern, which is a line image, and a solid pattern, which is a solid image.

In the development of an image by an electrophotographic apparatus, such as the image forming apparatus 100, the amount of toner adhered in the line image is about two times more than that in the solid image at most. For example, in the machine used in the current experiment, the amount of toner adhered in the line image was about 1.4 times more than that in the solid image on the average. Preferably, there is no difference between the amounts of toner adhered in the line image and the solid image. However, in many cases, the difference is allowed in a given range due to, for example, the size of a margin or a cost.

Therefore, it is preferable that an optimal current value in the pattern 1 shown in FIG. 3 be two times more than that in the pattern 2 since the amount of toner adhered in the line image is two times more than that in the solid image at most. Therefore, it is considered that the transfer current is corrected on the basis of the occupancy of the pattern with a large amount of toner adhered, such as the line image, in an image to be formed.

Reason 2: Different quality problems arise in the solid pattern and the line pattern.

Different quality problems arise in the solid pattern and the line pattern. Specifically, the following terms are likely to cause problems in a low-humidity and low-temperature environment. This example is suitable for a four-drum tandem intermediate transfer type, such as the image forming apparatus 100.

1. For Solid Image
   - The transfer current may be low to reduce or prevent white spots due to the discharge of the secondary transfer unit.
   - The transfer current may be high to reduce or prevent transfer scattering.
2. For Line Image
   - The transfer current does not relate to the formation of a void.
   - The void means a phenomenon in which a white spot is formed on, for example, a line due to low shear force in the primary transfer operation.
   - The transfer current may be high to reduce or prevent scattering during transport.

As can be seen from the above, when there is a solid image, it is necessary to balance the transfer current value. However, when there is only a line image, it is preferable to increase the transfer current to increase the tolerance of transport scattering.

Therefore, in the example shown in FIG. 3, the transfer current may increase for correction in the pattern 1, and the transfer current may be output without being corrected in the pattern 2.

Therefore, in the simplest constant current control, in general, the transfer current is balanced between the white spot of the solid image and the scattering of the solid image and the line image to prevent the occurrence of an error in any pattern.

However, in the current vertical transport type for reducing a space and a cost, in many cases, the tolerance of scattering is reduced due to, for example, restrictions in layout. Therefore, when a component tolerance is also considered, it is indispensable to improve the tolerance of the transfer process. In addition, in general, the problem of scattering is likely to arise in an image including a large number of line images. In the line image or an image having a character as a line in which the white spot of the solid image does not cause any problem, it is preferable to maximize the transfer current to improve the tolerance of scattering.

As such, even when the image area is the same, the transfer current value to be determined varies depending on the pattern of an image to be formed, for example, whether the image is a solid image or a linear image, and an environment in which an image is formed. That is, in the control of the transfer current based on the image area, the transfer current that is optimal in terms of the image area is not necessarily optimal in terms of the image pattern. That is, for example, as described above, even when the image area is the same, the amount of toner varies depending on the image pattern. Therefore, the optimal transfer current simply estimated from the image area may not a truly optimal current. In addition, since the quality problem depends on the image pattern, the optimal transfer current simply determined on the basis of the image area ratio may not ensure a stable image quality. As a result, image quality is unstable. Even when the transfer current is determined by the image area, image quality may be unstable. In addition, in some cases, the pattern of the image includes the arrangement of the image.

Therefore, for example, in the constant-current-control-type image forming apparatus according to the conventional technology, it is also considered that, when a line image or an image including only characters is input, constant current control is performed to set a large current value. However, this is not suitable since the actual output image includes lines and characters. In the transfer current control based on the coverage rate, for example, an image is divided into plural regions, and it is easy to form conditions, such as a region including a large number of line images and a region including a large number of solid images.

In the image forming apparatus 100, correction is performed on the basis of the conditions to improve the tolerance of scattering, thereby stabilizing image quality. That is, as a transfer current control method, correction corresponding to the pattern of an image to be formed is performed on the base value of a transfer current corresponding to the amount of toner of the image to be formed, and constant current control is performed such that a corrected current value is obtained. In this way, the tolerance of scattering is improved and image quality is stabilized. As described above, the image process conditions include the transfer bias in addition to the transfer current. The transfer bias is adjusted to an appropriate value by the correction of the transfer current.

Next, the control will be described along Steps S1 to S15 shown in FIG. 4.

Step S1

Figures 5, 6:
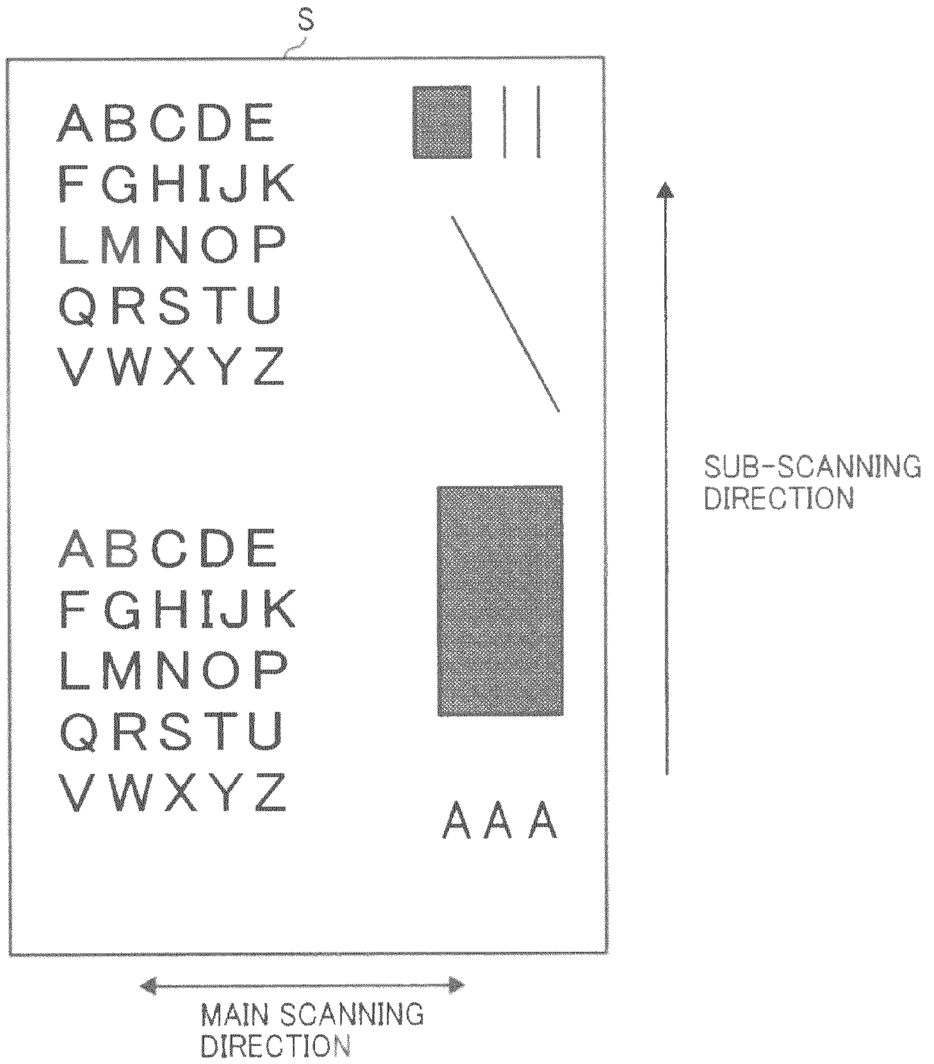
FIG. 5 is a table for determining the classification of image formation environments in the image forming apparatus shown in FIG. 1.
FIG. 6 is a plan view illustrating an example of an image formed by the image forming apparatus shown in FIG. 1.

The temperature detecting unit 69 and the humidity detecting unit 70 acquire the current temperature and humidity, i.e., the temperature and humidity in an image formation environment and determine one of the classified predetermined environments corresponding to the acquired temperature and humidity, as shown in FIG. 5.

Specifically, an absolute humidity is calculated from the temperature and humidity by the following expression:

Tenes' Expression: absolute humidity=217×(6.11×10 (7.5×temperature/(temperature+237.3)))/(temperature+273.15)×relative humidity×0.01.

Environmental classification is performed from the obtained absolute humidity using a table shown in FIG. 5.

FIG. 5 shows a table including the examination results obtained by experiments which correspond to this embodiment. The examination results vary depending on, for example, the kind of apparatuses, the characteristics of toner, and purposes. Therefore, values other than those shown in the table may be obtained.

In this embodiment, the environmental classification is updated whenever a print job, which is an image forming job, is input. However, the environmental classification may be updated, for example, when the apparatus starts up, when process control is performed, or at other timings. In this case, it is possible to obtain the same effect.

Data corresponding to FIG. 5 is stored as a table in the memory of the control unit 91 and the control unit 91 selects and sets the environmental classification on the basis of the absolute humidity calculated by the control unit 91. Therefore, the control unit 91 functions as an absolute humidity calculating unit, an environmental classification storage unit, and an environmental classification setting unit.

When the setting of the environmental classification ends, the control unit 91 stores a received print job in the memory. In this embodiment, for example, it is assumed that a print job shown in FIG. 6 is received. In the example shown in FIG. 6, it is assumed that a job to output an A3 sheet in the vertical direction is received and the vertical direction of the plane of FIG. 6 corresponds to the sub-scanning direction.

Step S2

The control unit 91 divides the image formed by the image forming job stored in the memory of the control unit 91 in Step S1 into 64 parts in the sub-scanning direction. Therefore, the control unit 91 functions as an image dividing unit. The division number is set according to the processing speed of the control unit 91 of the image forming apparatus 100 or a transfer current output power supply and it may be set according to more detailed conditions. In addition, a small number of divisions may be used depending on images. In this case, a sufficient effect is obtained.

Figure 7A:
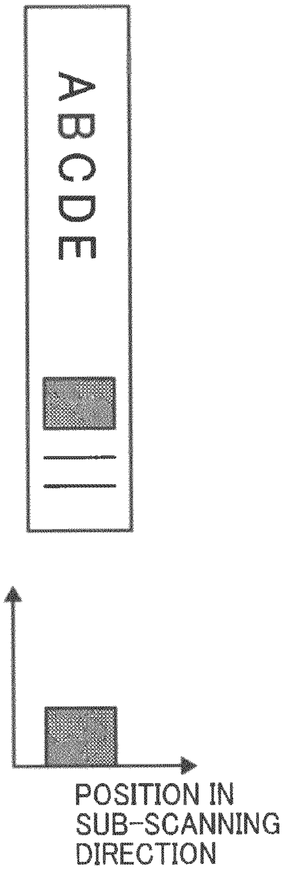
FIGS. 7A to 7C are conceptual diagrams illustrating the division of the image formed by the image forming apparatus shown in FIG. 1 in the sub-scanning direction and the pattern of the divided images.
Figure 7B:
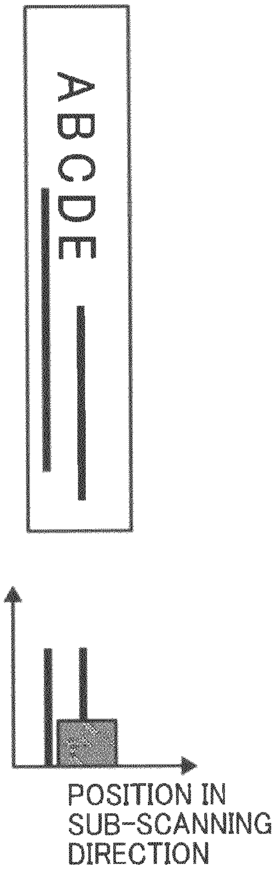
Figure 7C:
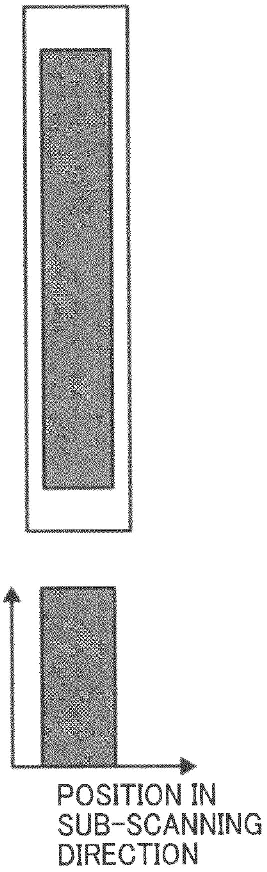

FIGS. 7A to 7C show an example of the divided images. FIG. 7A corresponds to the image shown in FIG. 6. In the image shown in FIG. 7A, the number of divisions is less than 64. FIGS. 7B and 7C show images obtained by dividing images different from the image shown in FIG. 6.

Step S3

The divided images are represented by N1, N2, N3, . . . , N64. Hereinafter, the divided images are represented by Ni. For convenience of processing, i is initialized to 0.

Step S4

Since the divided images Ni obtained in Step S3 are full color images, the colors of the divided images are separated into Y, M, C, and K. For example, image processing, such as binarization, is performed on the divided images, if necessary. Any method may be used to decompose the images into Y, M, C, and K and any image processing method may be used. The images decomposed into Y, M, C, and K are represented by Nik. A Y component of the image Ni is represented by Ni1, an M component thereof is represented by Ni2, a C component thereof is represented by Ni3, and a K component thereof is represented by Ni4. For initialization, k=0 is input.

Step S5

The images Nik are processed. First, 1 is added to k. Since i=k=1 is established, the images Nik indicate images N11. Integration is sequentially performed on each of the images Nik in the main scanning direction to calculate distributions at positions in the sub-scanning direction, as shown in lower parts of FIGS. 7A, 7B, and 7C. This may be performed only by decomposing the images Nik into pixels, determining whether there is a dot, and integrating the areas of the image in the main scanning direction. This is described as "averaging" in FIG. 4, which is the same as that in Step S10.

When the position in the sub-scanning direction is x, the distribution is represented by a function f(x). When the sum of the values is divided by the width of the image Nik in the main scanning direction, which is a constant value, for example, the width of an A3 sheet in this embodiment, the image area ratio and the coverage rate at the position in the sub-scanning direction are obtained. Therefore, the sum of the values is equivalent to the image area ratio and the coverage rate of the image Nik at the position in the sub-scanning direction.

A coverage rate S, which is the sum of the image area ratios of the images Nik, is calculated. The coverage rate S is obtained by dividing the image area, which is the print area of the images Nik and is obtained by integrating the sum at the position in the sub-scanning direction in the sub-scanning direction, by the area of all of the images Nik. This calculation is performed by the control unit 91. Therefore, the control unit 91 functions as an area ratio calculating unit.

Since the calculation in Step S5 is performed for the primary transfer operation, for example, the width of the primary transfer rollers 12Y, 12M, 12C, and 12BK or the transfer belt 11 is used as the width of the image Nik in the main scanning direction. In calculation for the secondary transfer operation, the width of the tension roller 33, the transfer belt 11, or the secondary transfer roller 64 is used as the width of the image Nik in the main scanning direction. The width of the image Nik in the sub-scanning direction is obtained by dividing the length of the transfer sheet S in the sub-scanning direction by the number of divisions.

Step S6

Figure 8:
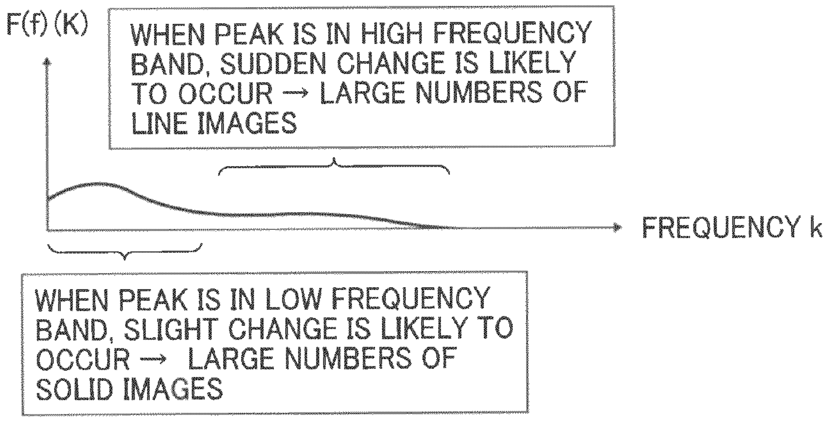
FIG. 8 is a conceptual diagram illustrating a state after Fourier transform is performed on the pattern of the image in the image forming apparatus shown in FIG. 1.

Discrete Fourier transform is performed on the distribution f(x) in the sub-scanning direction obtained in Step S5 to calculate a function F[f](k) of a frequency k. The function F[f](k) is for determining whether the number of solid images, which are continuous patterns, is large or the number of line images, which are patterns in separated portions, is large, as shown in FIG. 8. This calculation is performed by the control unit 91. Therefore, the control unit 91 functions as an image pattern quantification unit that quantifies the pattern of the images forming Nik using frequency characteristics obtained by Fourier transform.

Step S7

F[f](k) is used to predict the ratio of the solid image and the line image.

Specifically, a pattern correction coefficient is calculated by the following Expression 1:

$$(\text{pattern correction coefficient}) = \frac{\int_{k}^{\infty} F[f](k)\,dk}{\int_{k}^{\infty} F[f](k)\,dk + \int_{\frac{1}{L}}^{k} F[f](k)\,dk} \qquad (1)$$

where L is the width of an image in the sub-scanning direction during division.

The expression for the pattern correction coefficient calculates the occupancy of the number of line images in the entire image. As the pattern correction coefficient increases, it is predicted that the number of line images increased. The line image means a line image extending in the main scanning direction, but does not mean a line image extending in the sub-scanning direction. The definition expression is represented by an integral. However, actually, since F[f](k) is discrete function, the expression is represented by a series. Strictly, the expression is an infinite series, and calculation is stopped at an appropriate point. Specifically, calculation is performed from a frequency 1/L, which is the period of the width of the image to the reciprocal of the minimum dot. In the image forming apparatus 100, the minimum dot is 60 μm, which is a reference. To use FFT, the image needs to be divided by a power of 2, i.e., $2^n$. In this embodiment, the image is divided into 32 parts. When an A3 transfer sheet S is printed, the transfer sheet is divided for every 100 μm. Therefore, the control unit 91 serving as the image pattern quantification unit divides each of the Nik images Nik divided in the sub-scanning direction by a power of 2 and quantifies the pattern of the images using the frequency characteristics obtained by Fourier transform.

K dividing an integral region of Expression 1 corresponds to a threshold value between the line image and the solid image. In this embodiment, when the width of the image in the sub-scanning direction is more than 600 μm, the image is recognized as a line image. Therefore, K is 1.67×10^3, which is the reciprocal of 600 μm. When an A3 sheet is divided by 64, L is 420 mm/64=6.5625 mm.

Step S8

Specifically, a current corresponding to Nik is calculated. A current value, i.e., a transfer current control value related to the primary transfer is calculated by the following Expression 2, which is a transfer current calculation expression:

(transfer current)=(basic set value)×[1+(pattern correction coefficient)×{(line correction coefficient)+0.1×(pattern correction coefficient)}] (2).

Figures 9, 10:
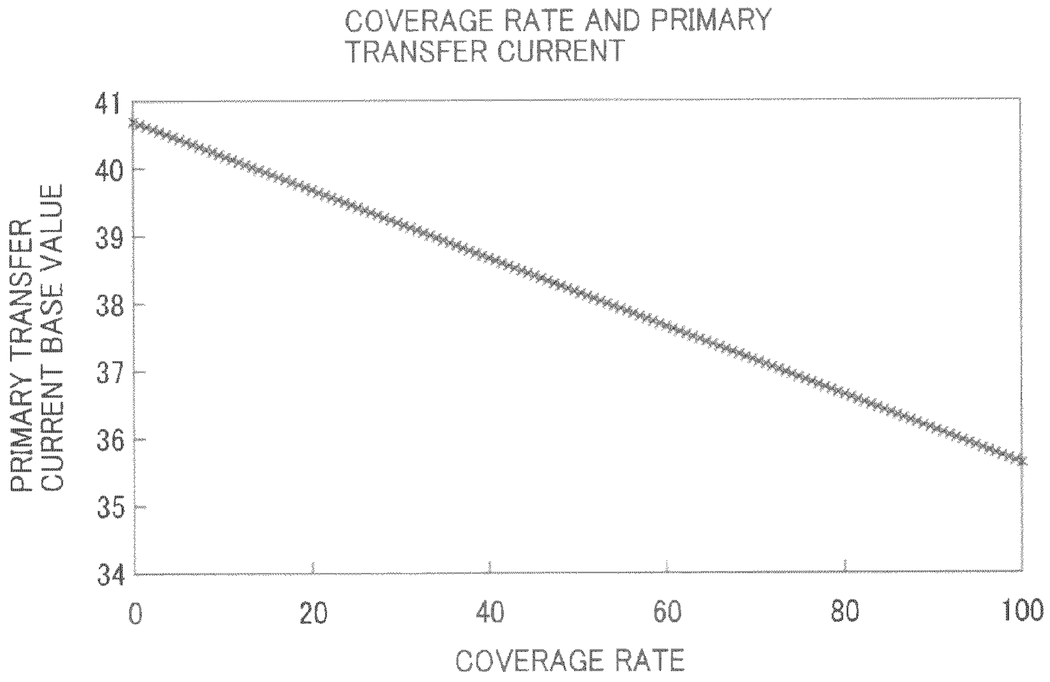
FIG. 9 is a diagram illustrating an example of a map for determining the base value of a transfer current on the basis of an image area ratio.
FIG. 10 is a table for determining a line correction coefficient used to correct the base value on the basis of the environmental classification which is determined on the basis of the table shown in FIG. 5.

In Expression 2, the basic set value is a reference current set value determined by each image area ratio, and is a base value determined by a map shown in FIG. 9 according to the coverage rate S calculated in Step S5. FIG. 9 is common to each color. The pattern correction coefficient is the value calculated by Expression 1, i.e., a value which corresponds to the pattern of the image forming Nik and is quantified by the control unit 91 serving as the image pattern quantification unit. The line correction coefficient is determined for each environmental classification shown in FIG. 10. A value "1" is determined by the characteristics of the image forming apparatus 100.

The map shown in FIG. 9 is stored in the memory of the control unit 91 and the base value is determined by the control unit 91 on the basis of the map. Therefore, the control unit 91 functions as a base value setting unit that sets the base value of the primary transfer current in the image process conditions on the basis of the area ratio of the image forming Nik. A table shown in FIG. 10 is stored in the memory of the control unit 91, and the line correction coefficient is determined by the control unit 91 on the basis of the table using the environmental classification set by the control unit 91 serving as the environmental classification setting unit.

The calculation of the transfer current, which is a correction value, by Expression 2 is performed by the control unit 91. That is, the control unit 91 functions as a correction value calculating unit that calculates a transfer current Iik, which is a corrected value of the base value set by the control unit 91 serving as the base value setting unit. When serving as the correction value calculating unit, the control unit 91 corrects the base value set by the control unit 91 serving as the base value setting unit on the basis of the pattern correction coefficient corresponding to the pattern of the image forming Nik and the line correction coefficient corresponding to the temperature and humidity in an image formation environment, as shown in Expression 2.

The amount of correction, which is the correction value calculated by the Expression 2, increases as the number of line images extending in the main scanning direction, which are included in the pattern of the image forming Nik, increases. That is, even when the total amount of toner forming the image pattern is the same, the value of the transfer current is corrected according to the ratio of the line image such that it increase as the number of line images increases. In this way, an image is formed with an appropriate transfer current. The control unit 91 stores the transfer current Iik, which is a correction value, as a primary transfer rate for Nik in the memory. Therefore, the control unit 91 functions as a correction value storage unit.

Figure 11:
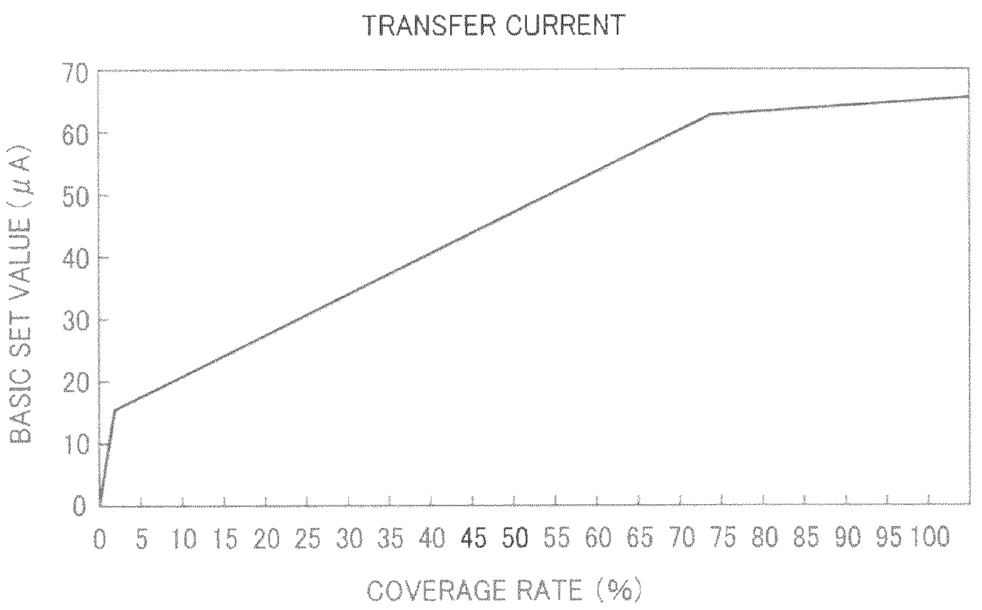
FIG. 11 is a diagram illustrating another example of the map for determining the base value of the transfer current on the basis of the image area ratio.

In this embodiment, the quality problem that is likely to arise for each environmental classification is added to create the table shown in FIG. 10. The table varies depending on various kinds of characteristics or the purpose of the design. Therefore, other values may be used. For example, the line correction coefficient may be determined on the basis of the temperature or the humidity. When attention is focused on the amount of toner adhered to the line, a constant value may be used without depending on the environmental classification. That is, the control unit 91 serving as the correction value calculating unit may correct the base value on the basis of at least the pattern of the image forming Nik. In this embodiment, the optimal values of the basic set values are preferably calculated in the primary transfer operation and the secondary transfer operation to further improve the effect. From this point of view, the basic set values are determined using different maps, as shown in FIG. 11, which will be described below. However, the basic set value may be common to the primary transfer operation and the secondary transfer operation. In addition, the basic set value may be changed for each of Y, M, C, and K, or Expression 2 may be multiplied by a correction coefficient to further improve the effect.

Step S9

When the calculation of a k-th image component of the image Ni in Steps S5 to S8 ends, it is determined whether k is 4. When k is less than 4, the process returns to Step S5 and calculation is performed on the next color. When k is 4, the calculation of the primary transfer current for Ni ends, and the secondary transfer current is calculated in Step S10 and the subsequent steps.

Steps S10 to S13

The secondary transfer current value of Ni is calculated. The flow of the calculation is the same as Steps S5 to S8 for the primary transfer current. The control unit 91 has the same functions as described above for the calculation of the correction value of the secondary transfer current. Expression 2 is used to calculate the secondary transfer current, which is a correction value. The basic set value is set by the control unit 91 serving as the base value setting unit using a map for a secondary transfer current which is shown in FIG. 11, is different from the map shown in FIG. 9, and is for determining the basic set value of the primary transfer current. The distribution of Ni in the main scanning direction is equal to the sum of the distributions of Y, M, C, and K in the main scanning direction. Therefore, the distributions of Y, M, C, and K in the main scanning direction until now may be stored in the memory and the distribution of Ni may be calculated from the distributions of Y, M, C, and K. In this way, the processing speed is improved. However, since the amount of memory used increases, the distribution may be used by the machine according to the purpose of use. The obtained result does not vary even when calculation is performed again and even when the data of each of Y, M, C, and K is used.

Step S14

When the calculation of an i-th image component in Steps S10 to S13 ends, it is determined whether "i" reaches the division number 64. That is, when $i<64$ is satisfied, there is an image that has not been calculated. The process returns to Step S10 and calculation is performed the next divided image. When $i=64$ is established, the calculation of all currents ends, and the calculation process ends.

Step S15

Figure 12:
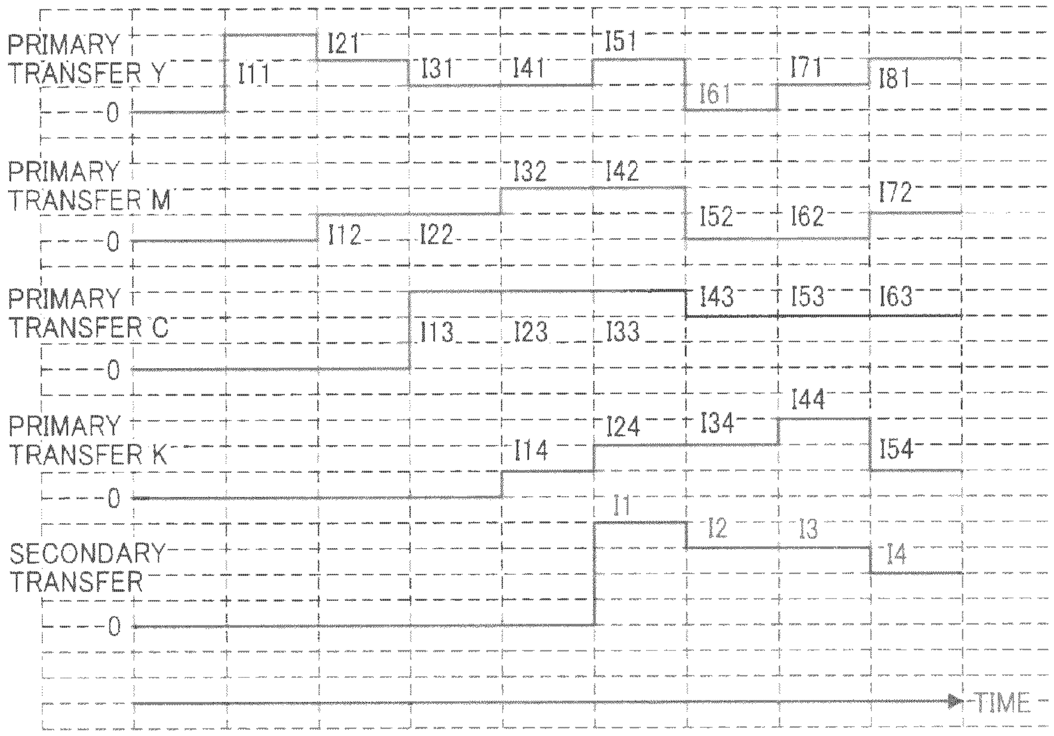
FIG. 12 is a timing chart illustrating the transfer current of the image forming apparatus shown in FIG. 1.

Constant current control is performed on the basis of the calculation result in Steps S1 to S14, using the transfer current, i.e., the correction value Iik of the primary transfer current and the correction value Ii of the secondary transfer current, and an image is formed. A detailed example is shown in FIG. 12. The reason why the current supply start timings deviate from each other is that, in a tandem intermediate transfer type, such as the image forming apparatus 100, writing starts from the upstream side and sequentially overlaps.

The control method according to this embodiment has been described above with reference to FIG. 4.

In this embodiment, the transfer current is controlled for each pattern of the image to be formed. However, similarly, other image forming process conditions, i.e., other image process conditions, such as development potential, may be controlled for each pattern. In this case, the same effect as described above is obtained. The image process conditions include, for example, the amount of toner supplied from the toner bottles 9Y, 9M, 9C, and 9BK to the developing devices 80Y, 80M, 80C, and 80BK, in addition to the development potential. This is because the amount of toner consumed depends on the image area ratio and the amount of toner consumed increases in the line image.

The flow of the control process has been described in brief above. Next, an example of the control process will be described in detail.

Current control for an image pattern shown in FIG. 13 will be described below.

For simplicity of description, it is assumed that the number of divisions in the sub-scanning direction is 5 and a blank in the sub-scanning direction is neglected. In addition, it is assumed that the widths of strip-shaped images in the sub-scanning direction are equal to each other. In the actual control process, when receiving a command to output the pattern shown in FIG. 13, first, the apparatus decomposes the pattern into Y, M, C, and K. However, in this embodiment, an example in which the apparatus decomposes the pattern into a single color K will be described.

The result is as follows. Since the image patterns shown in FIG. 13 have only different widths in the main scanning direction, only the absolute values of the power spectrums of FFT are different from each other, but the power spectrums have the same distribution. Only the frequency 1/L is a finite value, but other frequencies are all zero.

Figure 13:
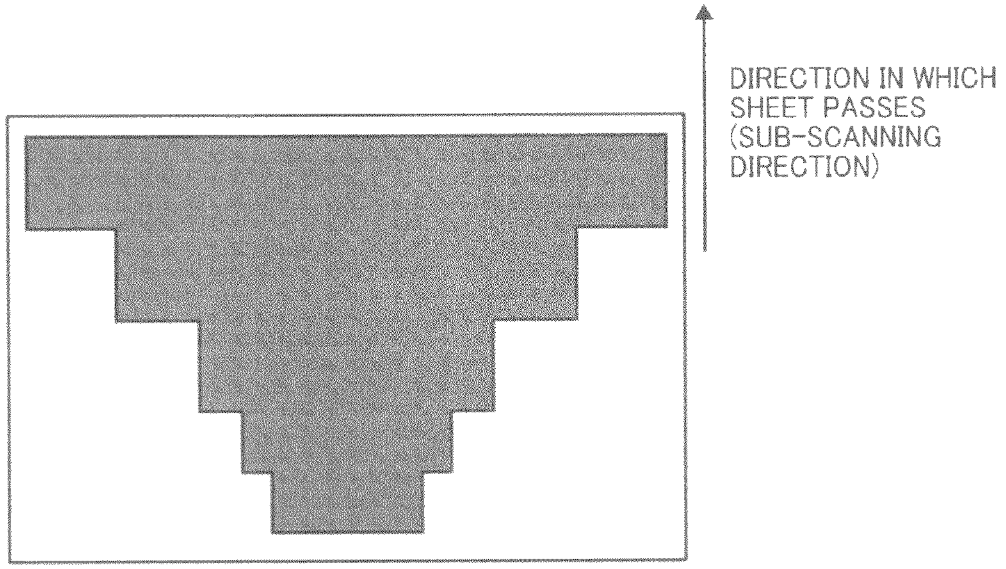
FIG. 13 is a plan view illustrating another example of the image formed by the image forming apparatus shown in FIG. 1.
Figure 14:
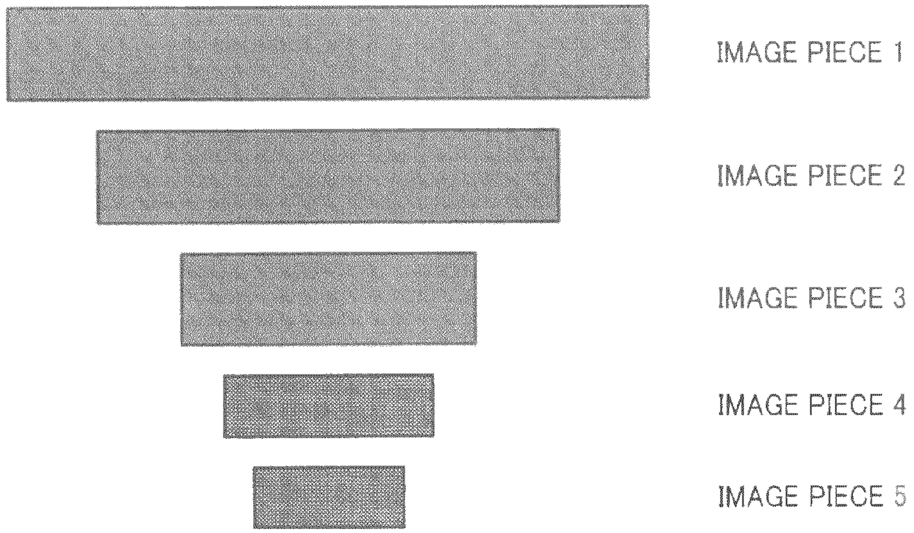
FIG. 14 is a conceptual diagram illustrating the division of the image shown in FIG. 13 in the sub-scanning direction.

When the pattern shown in FIG. 13 is divided into five parts, five strip-shaped images shown in FIG. 14 are obtained.

The average of the five image pieces in the main scanning direction is obtained, which is a distribution for each sub-scanning direction. In this case, when the number of divisions in the sub-scanning direction is a power of 2, FFT can be used, which is preferable. When a pattern is determined by methods other than FFT, other numbers of divisions may be used. In the example, since FFT is used, the number of divisions is 32.

When FFT is performed on a density distribution calculated by dividing a strip into 32 parts in the sub-scanning direction, only the frequency 1/L is a finite value and the other frequencies are zero in the example. Therefore, the pattern correction coefficient calculated by Expression 1 is zero, and a transfer current control value is determined from Expression 2 into which the pattern correction coefficient is substituted. That is, in the example, since there is no line image, the transfer current calculated by the Expression 2 is equal to the basic set value, and the correction value of the transfer current is equal to the basic set value. When only the correction value that is not equal to the basic set value is used as the correction value, the image forming apparatus 100 can form images using the correction value calculated by the control unit 91 serving as the correction value calculating unit.

Figure 15:
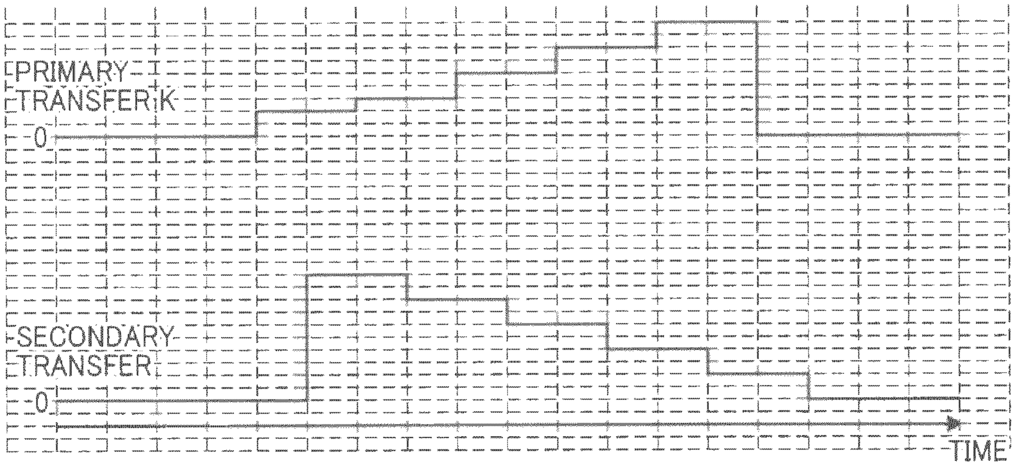
FIG. 15 is a timing chart illustrating a transfer current for the image shown in FIG. 13.

The basic set value of the image pattern shown in FIG. 13 is determined by the total area of the strips divided in the sub-scanning direction. The basic set values of the five strips are different from each other. When the above-mentioned calculation is performed on the image pattern shown in FIG. 13, a transfer current output shown in FIG. 15 is obtained.

Current control for an image pattern shown in FIG. 16 will be described below.

Figure 16:
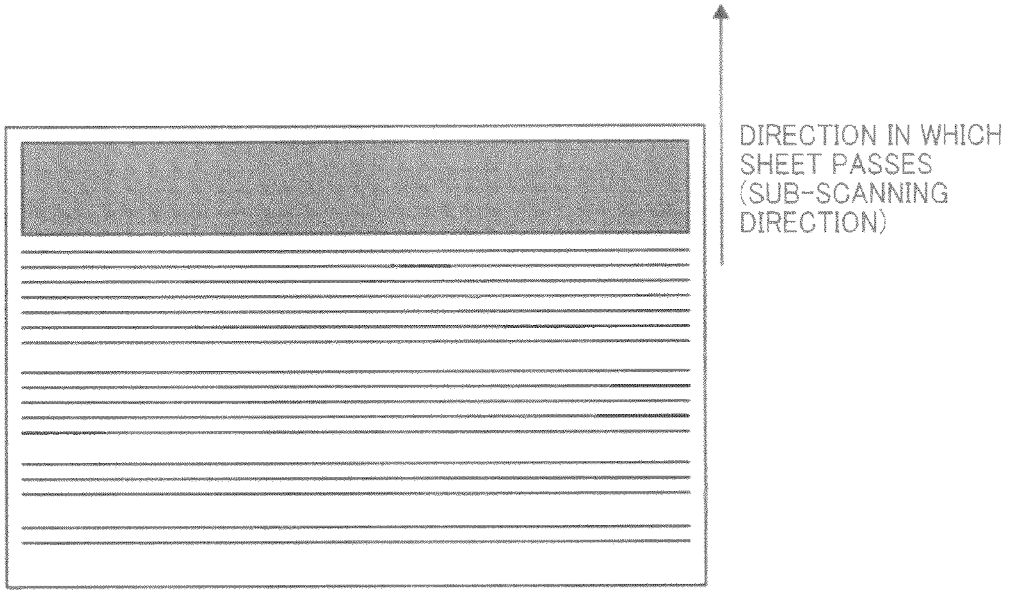
FIG. 16 is a plan view illustrating still another example of the image formed by the image forming apparatus shown in FIG. 1.

FIG. 16 shows an image composed of lines such that the coverage rate of five image pieces divided in the sub-scanning direction is equal to that of the image pattern shown in FIG. 13. A line N1 is the same solid image as that in the image pattern shown in FIG. 13, and lines N2 to N5 are line images. For ease of understanding, the lines are arranged at equal intervals in the image pieces. In this case, the process up to FFT is the same as that in FIG. 13, and the subsequent process is different from that shown in FIG. 13 from the result of FFT. Therefore, a description will be made from the result of FFT.

In the current control shown in FIG. 13, only the frequency 1/L is a finite value. However, in the current control shown in FIG. 16, the same peak appears at 1/L and 1/L+½. The size of the peak is the same as that in FIG. 13.

Therefore, the pattern correction coefficient calculated by Expression 1 is 0.5. This is the same as that in all of the image pieces.

Therefore, when the calculated value is substituted into Expression 2, the following Expression 3 is obtained:

(transfer current)=(basic set value)×[1+0.5×{(line correction coefficient)+0.05)}]   (3).

For the line correction coefficient, for example, when it is assumed that the classification shown in FIG. 5, i.e., the environmental classification is an MM environment, the line correction coefficient is 1.4, as shown in FIG. 10. When the line correction coefficient is substituted into Expression 3, the following Expression 4 is obtained:

(transfer current)=(basic set value)×[1+0.5×1.45]   (4).

Figure 17:
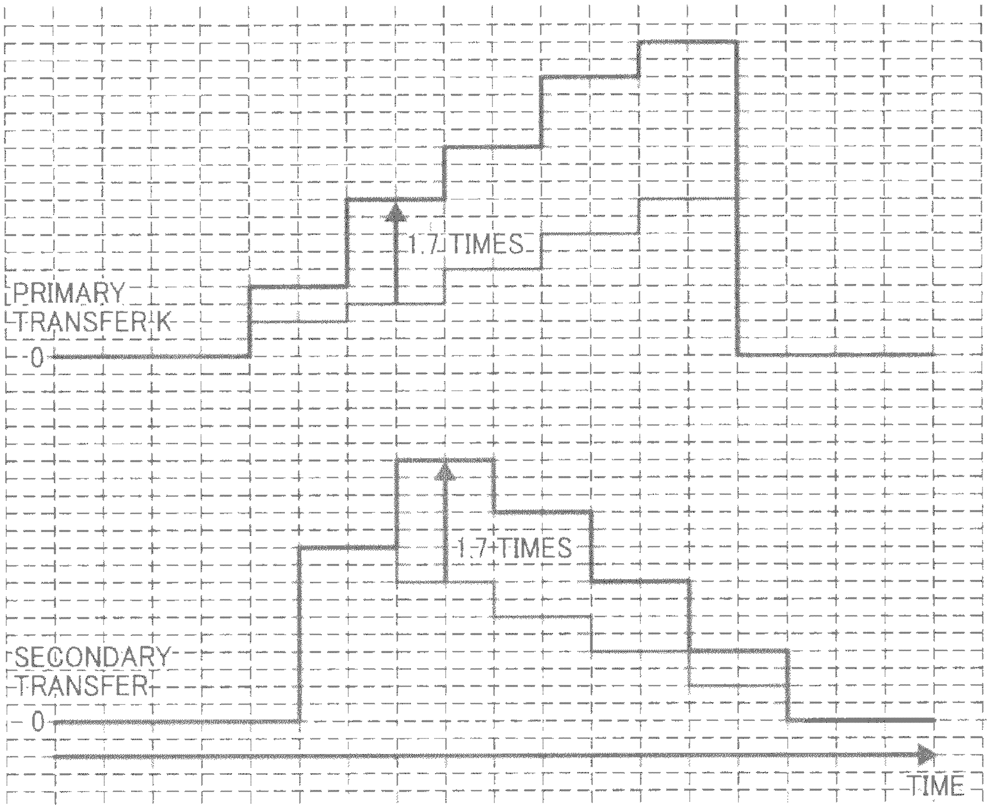
FIG. 17 is a timing chart illustrating a transfer current for the image shown in FIG. 16.

Therefore, when the transfer current control shown in FIG. 13 is applied to the timing chart of FIG. 15 corresponding to the case shown in FIG. 13, a timing chart as shown in FIG. 17 is obtained. In FIG. 17, a thick line indicates the case shown in FIG. 16, and a thin line indicates the case shown in FIG. 13. As can be seen from the waveforms shown in FIG. 17, a common current is used for the solid image and the transfer current increases a line image portion.

For optimization of transfer current calculation conditions for each image pattern divided in sub-scanning direction It is preferable that the value of the secondary transfer current be controlled to increase on the downstream side in the transport direction of the transfer sheet S, i.e., at the leading end. The reason is as follows. When the transfer sheet S enters the secondary transfer portion 57, the electric field of the secondary transfer portion 57 is not stable immediately after the transfer sheet S enters the secondary transfer portion 57, and the value of the secondary transfer current is relatively reduced. When the value of the secondary transfer current is reduced, scattering is generated. That is, in the secondary transfer operation, scattering tends to occur in the image at the leading end of the transfer sheet S.

Therefore, it is preferable that the correction value of the secondary transfer current be calculated such that it increases as the image pattern is closer to the leading end of the transfer sheet S among the image patterns divided in the sub-scanning direction. Specifically, for example, instead of Expression 2, the following Expression 2' is used to calculate the transfer current, which is the correction value:

(transfer current: leading end)=(basic set value)×[1+(pattern correction coefficient)×{(line correction coefficient)+0.2×(pattern correction coefficient)}]

(transfer current: others)=(basic set value)×[1+(pattern correction coefficient)×{(line correction coefficient)+0.1×(pattern correction coefficient)}]   (2').

If the transfer current control using Expression 2' is applied to the timing chart of FIG. 15 corresponding to the case shown in FIG. 13, a timing chart as shown in FIG. 13 is obtained.

Figure 18:
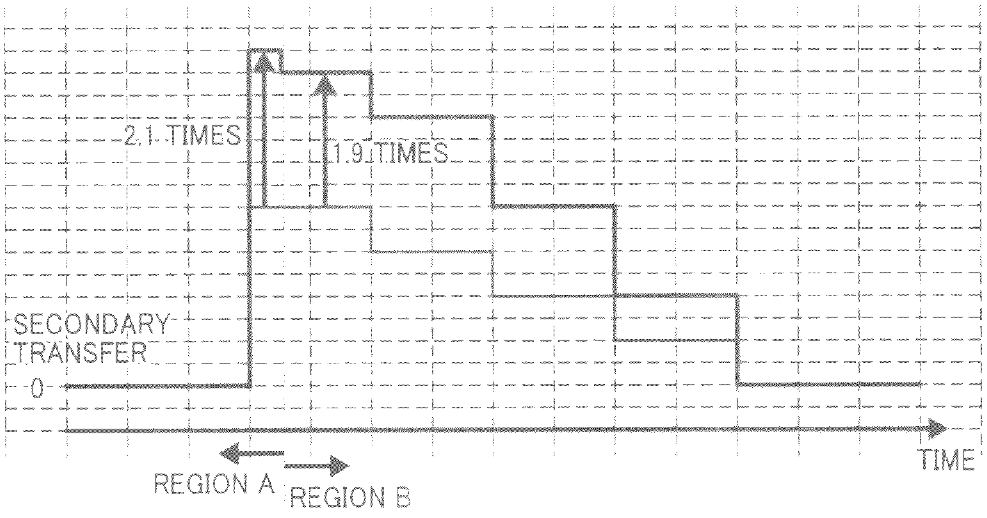
FIG. 18 is a timing chart illustrating a transfer current for the image shown in FIG. 13 which is calculated by another method.

Expression 2' is used to individually calculate the secondary transfer current in a region A of the transfer sheet S at the leading end in the sub-scanning direction and a region B other than the region A in FIG. 18, in the secondary transfer operation. As can be seen from FIG. 18, the correction value of the secondary transfer current is large at the leading end of the transfer sheet S. In this way, scattering at the leading end is reduced, and image quality is stabilized and improved.

However, in a transfer sheet S having a low separation property, such as a thin sheet or a coating sheet, it is preferable that the secondary transfer current at the leading end of the transfer sheet S be small. Therefore, when an image is formed on the transfer sheet S having a low separation property, Expression 2 is preferably used. When an image is formed on the other transfer sheets S, Expression 2' is preferably used.

For example, since an object of this example is to prevent scattering at the leading end, the boundary between the region A and the region B is disposed at a position suitable to achieve the object. In addition, the division into the region A and the region B is sufficient to achieve the object. However, the number of divided regions may be three or more.

This optimization can be appropriately applied to each of the following examples.

For optimization of transfer current calculation conditions of each of Y, M, C, and K As described above, when the basic set value of each of Y, M, C, and K is changed, the transfer current is effectively corrected. This is matched with the tendency in which the color image forming apparatus changes the control value on the basis of a difference in the arrangement, the order of superimposition, and characteristics of each color, specifically, each color toner, thereby improving image quality.

Specifically, a current base value serving as a transfer basic set value, which was a basic set value related to the primary transfer current, and a determination expression of the pattern were changed and optimized for each color by experiments. It was assumed that, for the former, the current base value was determined by a map shown in FIG. 19 and for the latter, the correction value of the transfer current of each color was calculated by the following expression group:

(transfer current *Y*)=(basic set value *Y*)×[1+(pattern correction coefficient)×{0.3+0.1×(pattern correction coefficient)}]

(transfer current *M*)=(basic set value *M*)×[1+(pattern correction coefficient)×{0.7+0.1×(pattern correction coefficient)}]

(transfer current *C*)=(basic set value *C*)×[1+(pattern correction coefficient)×{0.7+0.1×(pattern correction coefficient)}]

(transfer current *K*)=(basic set value *K*)×[1+(pattern correction coefficient)×{0.5+0.1×(pattern correction coefficient)}]   (5).

Figure 19:
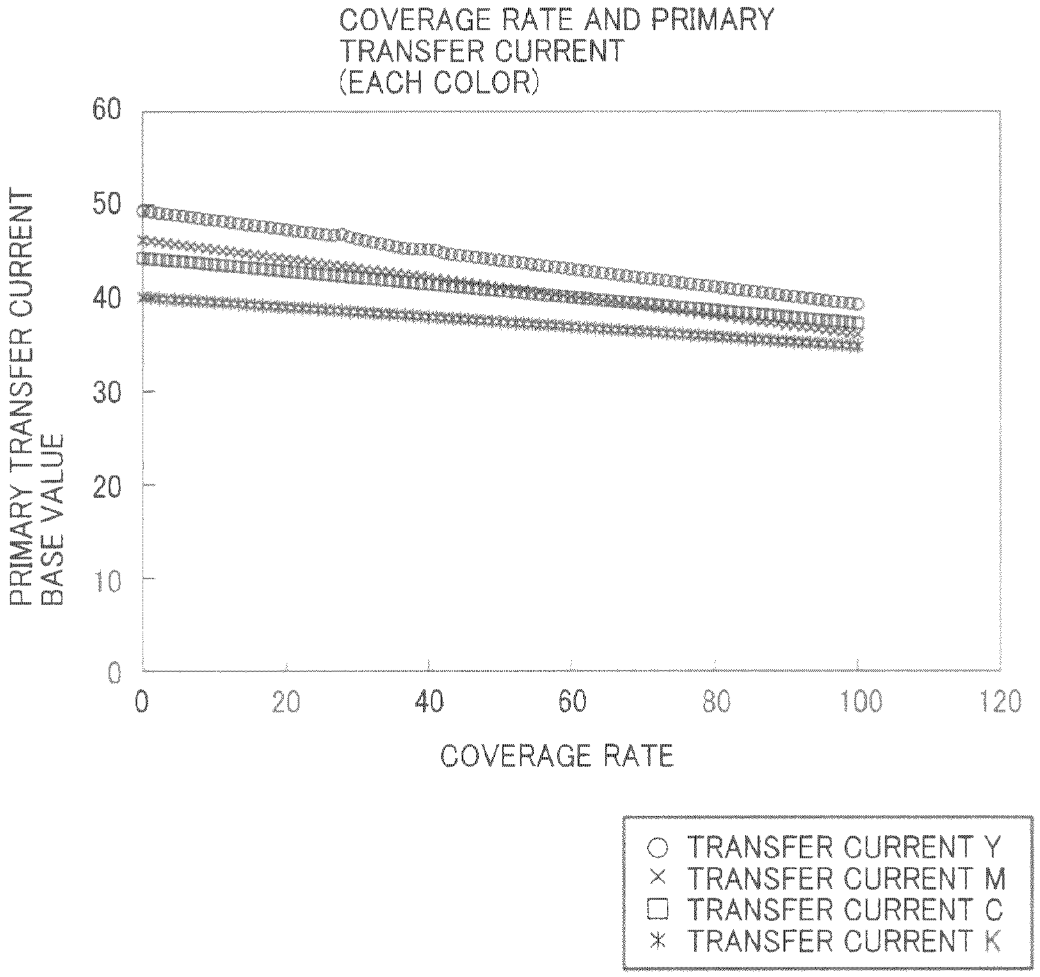
FIG. 19 is a diagram illustrating still another example of the map for determining the base value of the transfer current on the basis of the image area ratio.

The map shown in FIG. 19 corresponds to that shown in FIG. 9, and the expression group corresponds to Expression 2, which is a transfer current calculation expression.

FIG. 18 is characterized in that, in an aspect in which the image carrier on the downstream side has a small transfer current in a four-drum tandem type, a plurality of image carriers has different basic set values, which are conditions for calculating the correction value of the transfer current. This is identical to a generally known technique for improving image quality. In the above-mentioned aspect, the basic set value is appropriately set according to circumstances. In Expression 2, the line correction coefficient is a variable. However, in Expression 5, the line correction coefficients are integers "0.3," "0.7," "0.7," and "0.5," i.e., fixed values.

As such, the optimization of the control coefficients and the base value makes it possible to obtain high image quality while obtaining an abnormal image tolerance with the same level as that in the above-mentioned aspect using Expression 2. As can be seen from this, the expression for calculating the correction value of the transfer current, or the coefficients and variables of the expression are appropriately optimized. This is the same for the secondary transfer current as well as the primary transfer current.

For adjustment between transfer currents corresponding to images divided in sub-scanning direction When there is a large change between the values of the transfer currents calculated for each of adjacent images divided in the sub-scanning direction, it is preferable to perform a process for preventing the change on the calculated transfer current.

The reason is as follows. When the transfer current is simply set in the above-mentioned way to correspond to a rapid change in the coverage rate of adjacent images divided in the sub-scanning direction, the transfer current set between the adjacent images is likely to be greatly changed. In this case, a power supply output is disturbed at the moment when the transfer current is greatly changed, which appears the disturbance of the image. In particular, in the calculation of the transfer current by the above-mentioned method, for example, when a set of line images comes from a solid image with a small area, the transfer current value is likely to be greatly changed. As a result, the disturbance of the image is likely to occur.

Figure 20:
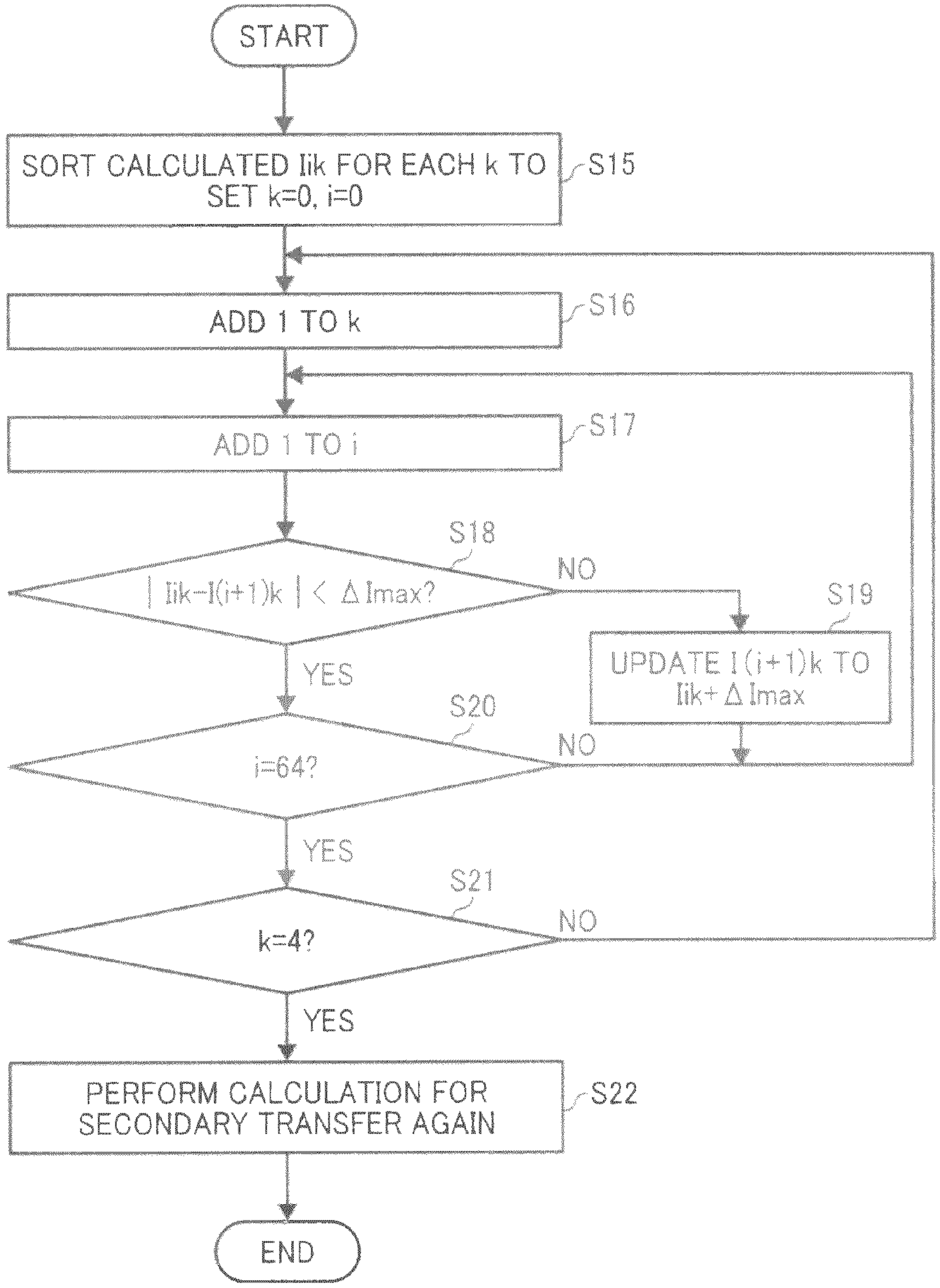
FIG. 20 is a flowchart illustrating a portion of another example of the image forming method according to the embodiment.

When a change in current is equal to or more than a predetermined value, it is preferable to perform a process of adding a limiter that reduces output disturbance not appear in the image. The detailed flow of the control process is shown in FIG. 20. FIG. 20 shows only Steps S15 to S22, which are performed between Step S14 and Step S13 shown in FIG. 4. Therefore, when the process shown in FIG. 20 is performed, Step S15 shown in FIG. 4 is performed as Step S23 after Step S22 shown in FIG. 20.

The process shown in FIG. 20 will be described. First, a limiter process is performed on the primary transfer current value Iik, which is the transfer current value for the divided images Nik. Then, the limiter process is performed on the secondary transfer current value Ii, which is the transfer current value for the divided images Ni.

In the limiter process for the primary transfer current value Iik, first, the primary transfer current value Iik is sorted for each k, i.e., each color, and i and k are set to 0 (Step S15). Then, 1 is added to k (Step S16), and 1 is added to i (Step S17). It is determined whether a change in the primary transfer current value Iik, |Iik−I(i+1)k|, is more than a maximum value ΔImax, which is an allowable limit (Step S18). In this way, it is determined whether the difference between the primary transfer current values of two images of the same color which are adjacent to each other in the sub-scanning direction among the images divided in the sub-scanning direction is more than the maximum value ΔImax.

When the difference is more than the maximum value ΔImax, the primary transfer current value I(i+1)k of one image on the downstream side in the sub-scanning direction of the two images of the same color is updated to a value obtained by adding ΔImax to the previous current value, i.e., the primary transfer current value Iik of the other image on the upstream side in the sub-scanning direction of the two images of the same color (Step S19). When the difference is equal to or less than the maximum value ΔImax, the update does not performed and it is determined whether reaches 64 (Step S20). Until i reaches 64, Steps S17 and S18 are performed. If necessary, Step S19 is performed.

When i reaches 64, it is determined whether k reaches 4 (Step S21). Until k reaches 4, Steps S17, S18, and S20 are performed. If necessary, Step S19 is performed. When an update is needed, the update is performed on all colors.

When k reaches 4, a limiter process is performed on the secondary transfer current value Ii, similar to the limiter process for the primary transfer current value Iik (Step S22).

In this way, a power supply output is prevented from being unstable and the disturbance of an image is suppressed or prevented.

The limiter process for the transfer current value in Steps S15 to S22 shown in FIG. 20 is performed by the control unit 91. Therefore, the control unit 91 functions as a transfer current limiter processing unit.

Addition of determination of line in sub-scanning direction

In the above-mentioned example, FFT is performed in the sub-scanning direction to determine whether the image is a line image or a solid image, thereby maintaining the balance between the processing speed and the accuracy of prediction. However, in the determination, for the line image, only the line image extending in the main scanning direction is treated as a line image, and the line image extending in the sub-scanning direction is not treated as a line image. A phenomenon in which toner is scattered in the line image is more likely to occur in the line image extending in the main scanning direction than in the line image extending in the sub-scanning direction, which wilt be described below.

However, it is preferable that the scattering of toner in the line image extending in the sub-scanning direction be also considered to form a high-quality image.

Therefore, it is preferable that the line image extending in the sub-scanning direction be also included in the image pattern whose basic set value is corrected. This will be described below.

The basic idea is the same as that in the above-mentioned correction method. Specifically, the image shown in FIG. 7A will be described as an example.

Figure 4:
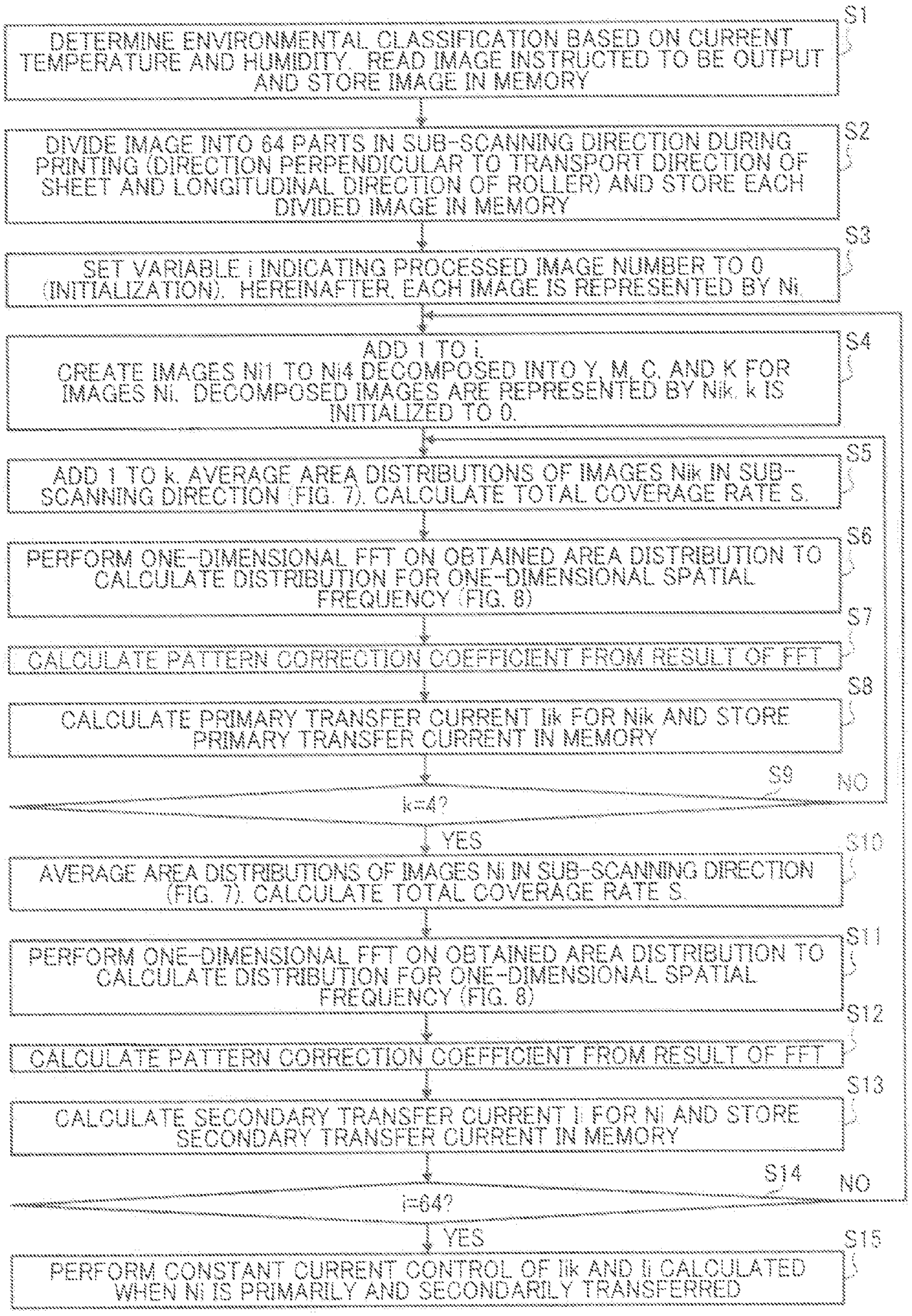
FIG. 4 is a flowchart illustrating an example of an image forming method according to the embodiment.

In FIG. 7A, in Step S5 shown in FIG. 4, integration is performed in the main scanning direction to calculate distribution at the position in the sub-scanning direction, as shown in a lower part of FIG. 7A. However, as can be seen from the image at the lower part of FIG. 7A, the line image extending in the sub-scanning direction is not recognized by this method.

Figure 21:
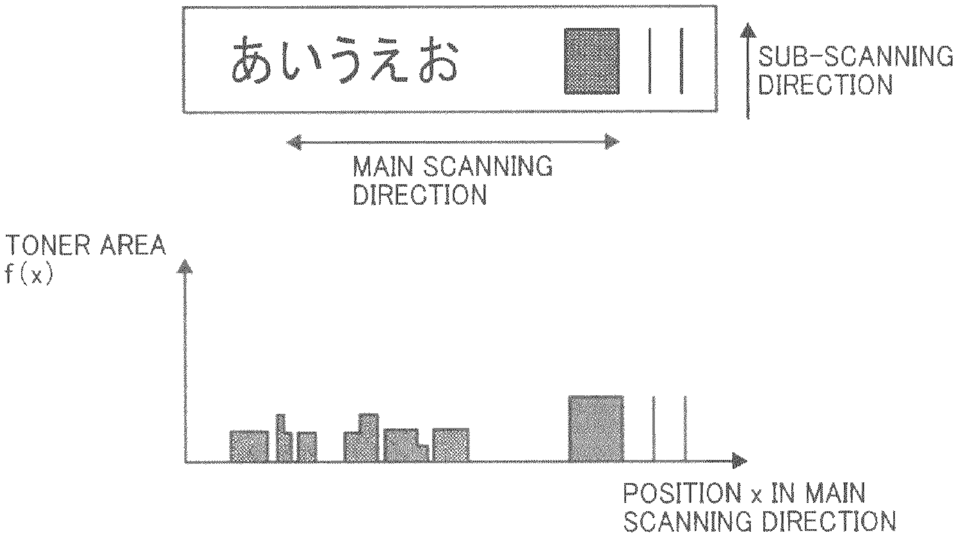
FIG. 21 is a conceptual diagram illustrating an example in which the correction value calculated by the correction value calculating unit varies depending on a linear image extending in the sub-scanning direction.

Therefore, to recognize the line image extending in the sub-scanning direction, as shown in FIG. 21, averaging, i.e., integration is performed in the sub-scanning direction to obtain a function f(x) (x is a position in the main scanning direction), which is a distribution at the position in the main scanning direction, as shown in the lower part of FIG. 21. A method of calculating the function f(x) and the subsequent processing methods are all the same as described above. To correct the line image extending in the sub-scanning direction, the following Expression 6 corresponds to Expression 2:

(transfer current)=(basic set value)×[1+{(main scanning direction pattern correction coefficient)+(sub-scanning direction pattern correction coefficient)}×{(line correction coefficient)+0.1×(main scanning direction pattern correction coefficient)+(sub-scanning direction pattern correction coefficient)}] (6).

In Expression 6, a term “sub-scanning direction pattern correction coefficient” is added, as compared to Expression 2). A term “main scanning direction pattern correction coefficient” corresponds to the term “pattern correction coefficient” in Expression 2. The amount of correction of the correction value calculated by Expression 6 increases as the number of line images included in the pattern of the image increases, similar to the calculation using Expression 2. That is, even when the total amount of toner in the image with the pattern is the same, the value of the transfer current varies depending on the ratio of the line image included in the pattern. As the number of line images increases, the value of the transfer current is corrected to increase. In this way, an image is formed with an appropriate transfer current. However, in Expression 6, as the number of line images extending in the sub-scanning direction increases, the calculated correction value increases, as compared to Expression 2.

Figure 22:
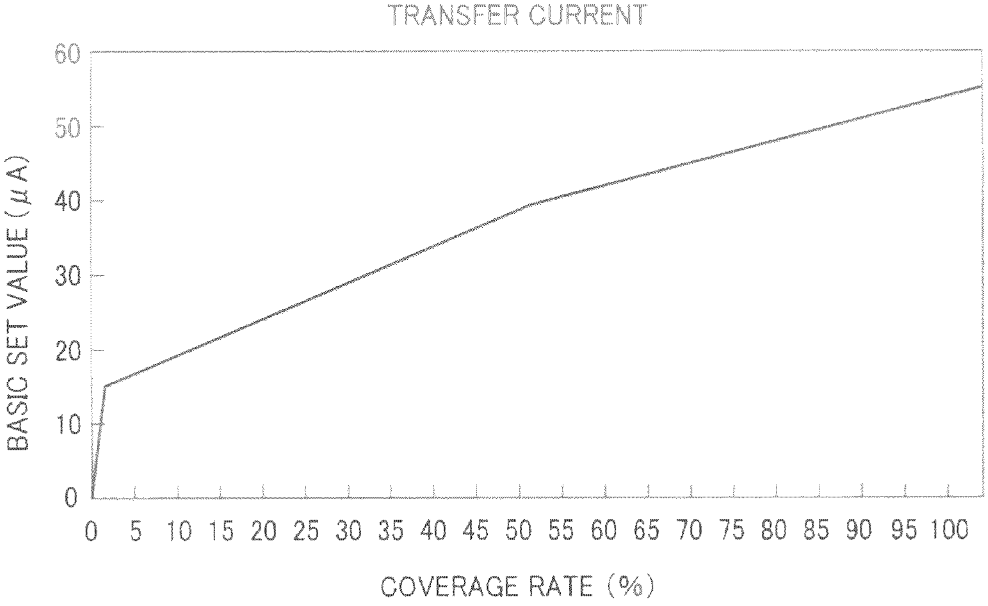
FIG. 22 is a diagram illustrating yet another example of the map for determining the base value of the transfer current on the basis of the image area ratio.

The basic set value in Expression 6 is slightly less than that in Expression 2. For example, a map shown in FIG. 22 is used for the secondary transfer current. This is obtained by optimization according to the difference between Expression 6 and Expression 2. In this example, calculation is separately performed in the main scanning direction and the sub-scanning direction, but other calculation methods may be used. Any other expressions may be used instead of Expression 6 as long as they can obtain the same effect as described above.

A supplementary description of the difference between the line image extending in the main scanning direction and the line image extending in the sub-scanning direction will be made. A typical example of the phenomenon in which toner is scattered during transport is that there is a member at a high potential in the transport path due to, for example, triboelectric charging and toner is attracted to the member. In transport scattering, in many cases, toner is scattered in the sub-scanning direction which is the transport direction of the transfer sheet S. Therefore, a line attracted in the main scanning direction is the severest condition. On the other hand, in a line attracted in the sub-scanning direction, the scattering of toner is less likely to occur.

Figure 23A:
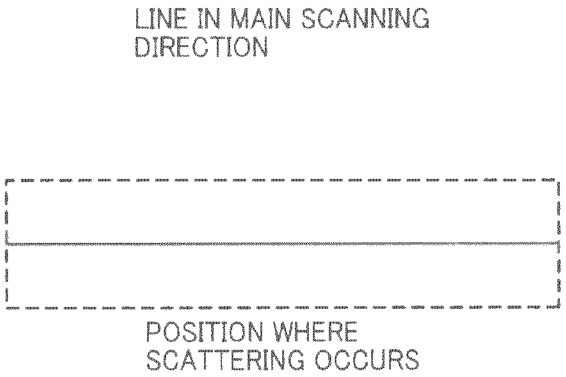
FIGS. 23A and 23B are conceptual diagrams illustrating an example in which the aspect of the scattering of toner is different when a linear image extends in the main scanning direction and when a linear image extends in the sub-scanning direction.
Figure 23B:
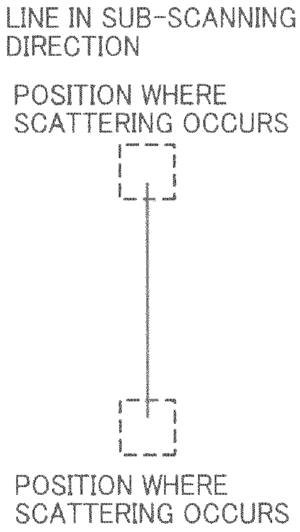

This is shown in FIGS. 23A and 23B. As shown in FIG. 23A, in the line image attracted in the main scanning direction, the entire line is scattered in a direction vertical to the main scanning direction in which the line image extends in a region surrounded by a dashed line and is conspicuous. However, as shown in FIG. 23B, in a line image extending in the sub-scanning direction, a line is scattered to slightly extend, as represented by a dashed line, and is less likely to be conspicuous.

Therefore, as in the example using Expression 2, paying attention to the line image in the main scanning direction is most effective. In this case, it is easy to maintain a balance with the calculation time. However, for example, when there is enough time to perform the calculation process, as in the example using Expression 6, the calculation process is also performed on the line image extending in the sub-scanning direction, thereby improving the effect. In particular, when the ratio of the amount of toner adhered in the solid image to the amount of toner adhered in the line image is high, it is preferable to perform the calculation process on the line image extending in the sub-scanning direction to improve the effect. However, contrary to Expression 2, the calculation process may be performed on the line image extending in the sub-scanning direction and the calculation process for the line image extending in the main scanning direction may not be considered.

Verification Test by Experiment

Figure 24:
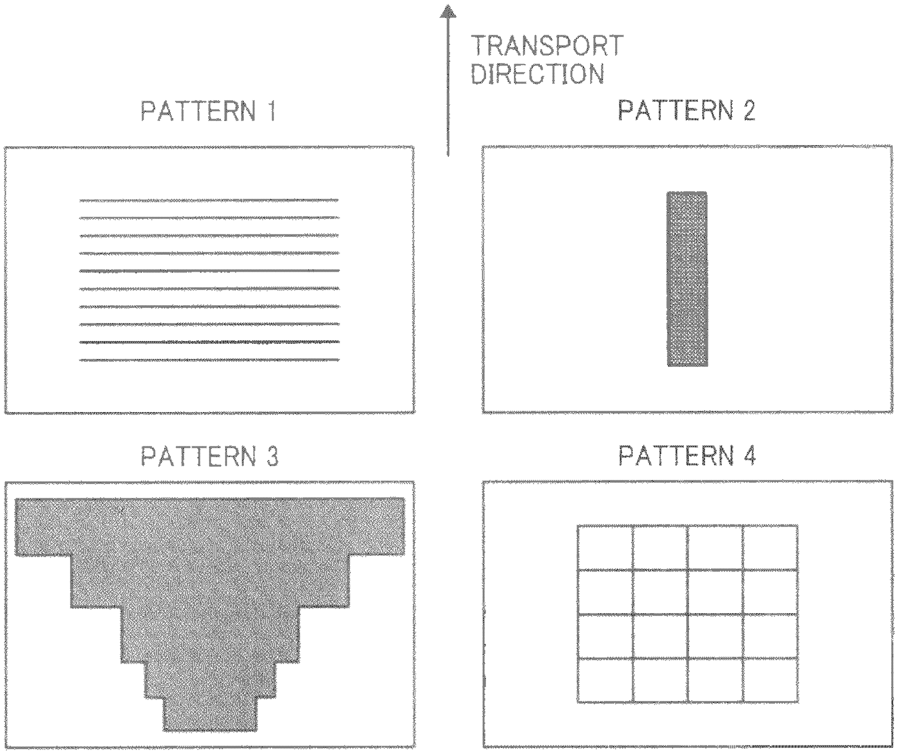
FIG. 24 is a diagram schematically illustrating image patterns used in the verification test by experiments.

In an image forming apparatus of a four-drum tandem intermediate transfer type, such as the image forming apparatus 100, the following three transfer current control processes were performed and sensory evaluation was performed on the scattering of toner, density irregularity, and white spots in four kinds of images shown in FIG. 24 which are output from each control process. In addition, the evaluation of density irregularity was performed on an image including a solid patch, which is a solid image, i.e., pattern 2 and pattern 3 shown in FIG. 24, and it was determined whether color irregularity in the plane was viewed by the eye.

1. Constant current control
2. Constant current control based on coverage rate
3. Control in which image pattern correction is added to coverage rate The control method 2 corresponds to the conventional technology. The control method 3 corresponds to the control method of calculating the transfer current using Expression 2 in the image forming apparatus 100.

For ease of understanding of difference, a developer after 1000 sheets pass through at a low coverage rate of 0.1% was used and a transport layout in which transport scattering is likely to occur was sued. The sensory evaluation was performed in an environment in which the temperature was 10° C. and the humidity was 15% RH.

The result of the sensory evaluation is shown in Table 1, in which "O" indicates good quality, "Δ" indicates slightly bad quality, and "x" indicates bad quality.

As can be seen from Table 1, in the constant current control, which is the control method 1, as shown in pattern 3, in a chart in which the coverage rate is changed depending on the sub-scanning position, it is difficult to obtain uniform density. Therefore, the density irregularity is more than that in the control methods 2 and 3.

The evaluation result of the white spot is good in all conditions. This is because the basic transfer current is set to a small value in all conditions to prevent white spots. However, scattering occurs as an adverse effect. Actually, in the control methods 1 and 2, in pattern 4, scattering occurs in the sheet transport direction.

In the control method 3, the transfer current is controlled to increase in an image including a large number of lines. Therefore, the tolerance of scattering is improved and transport scattering is at a level where it is not viewed by the eye. In addition, in the control method 3, a white spot caused by a discharge, which is an adverse effect, is a line and hardly appears. Therefore, there is no adverse effect.

As such, the practical effect of the control method 3 was proved by the above-mentioned experiment.

TABLE 1

| Control method | Transport scattering | Density irregularity | White spot |
|---|---|---|---|
| Pattern 1 | | | |
| 1. | Δ | — | O |
| 2. | Δ | — | O |
| 3. | O | — | O |
| Pattern 2 | | | |
| 1. | Δ | O | O |
| 2. | Δ | O | O |
| 3. | O | O | O |
| Pattern 3 | | | |
| 1. | x | x | O |
| 2. | Δ | O | O |
| 3. | O | O | O |
| Pattern 4 | | | |
| 1. | x | — | O |
| 2. | x | — | O |
| 3. | O | — | O |

The control unit 91 stores, in the memory, a computer program (hereinafter, "image forming program") for performing an image forming method capable of forming an image on the basis of the correction value calculated by the control unit 91 serving as the calculating unit, using the control unit 91 serving as the base value setting unit that sets the base value of the image process conditions on the basis of the area ratio of an image to be formed and the control unit 91 serving as the correction value calculating unit that calculates a correction value obtained by correcting the base value set by the control unit 91 serving as the base value setting unit on the basis of at least the pattern of the image. Therefore, the control unit 91 and the memory function as an image forming program storage unit. The image forming program need not necessarily be stored in the memory of the control unit 91. The image forming program may be stored in a computer readable recording medium such as a semiconductor medium (for example, ROM and non-volatile memory), an optical medium (for example, DVD, MO, MD, and CD-R), a magnetic medium (for example, a hard disk, a magnetic tape, and a flexible disk), or any other recording medium.

Figure 25:
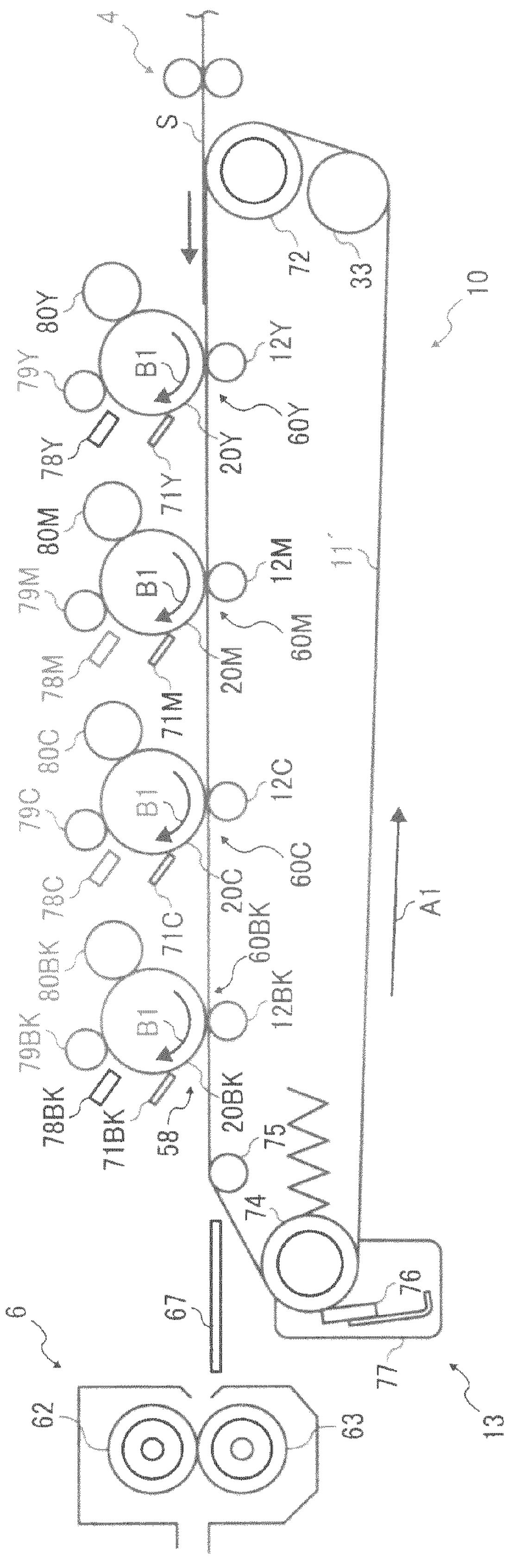
FIG. 25 is a front view schematically illustrating a portion of another example of the image forming apparatus according to the embodiment.

While the above embodiment is described as being applied to a tandem image forming apparatus of indirect transfer type, it may be applied to a tandem image forming apparatus of direct transfer type as shown in FIG. 25. FIG. 25 shows a portion of a tandem image forming apparatus of a direction transfer type. In FIG. 25, the same components as previously described are denoted by the same reference numerals. The image forming apparatus includes a sheet transport belt 11', which is a recording medium transport body, instead of the transfer belt 11, and sequentially transfers each color toner image formed by image forming units 60BK, 60C, 60M, and 60Y to a transfer sheet that is transported by the sheet transport belt 11' such that the color toner images are superimposed on each other. The flow of a basic control process for performing the image forming method is the same as described above. However, since there is no secondary transfer operation, the basic set value of the primary transfer operation is different from that previously described, and an output of 5 μA is increased at each area ratio for the basic set value in the case using Expression 2.

While the above embodiment is described as being applied to a tandem image forming apparatus, it may also be applied to a one-drum-type image forming apparatus that sequentially forms color toner images on one photosensitive drum to be superimposed on one another to form a color image. Further, the above embodiment may also be applied to other types of image forming apparatuses. Examples of such image forming apparatuses include one in which a separate intermediate transfer body is used to superimpose the developed color toner images on an image carrier, such as a sheet-shaped organic photoreceptor, one using a plurality of intermediate transfer bodies, and one using an intermediate color toner.

In recent years, color image forming apparatuses, such as a color copier and a color printer, have been generally used to meet the demands from the market. However, the image forming apparatus may form a monochrome image.

The developer used in the image forming apparatus is not limited to the two-component developer, but may be a one-component developer.

The image forming apparatus of the embodiment may be a copier, a printer, or a facsimile machine. The image forming apparatus may also be a multifunctional product having the functions of a copier and a printer or the functions other combinations of a copier, a printer, and a facsimile machine.

While some effects that can be achieved by the embodiment are described, they are not limited to those described herein.

According to the embodiment, the image forming apparatus includes a base value setting unit that sets a base value of an image process condition on the basis of the area ratio of an image to be formed and a correction value calculating unit that calculates a correction value obtained by correcting the base value set by the base value setting unit on the basis of at least the pattern of the image. The image is formed using the correction value calculated by the correction value calculating unit. By correcting the base value set on the basis of the image area ratio according to at least the pattern of the image and adjusting the image process condition, it is possible to stably form a high-quality image.

The image forming apparatus may further include an image pattern quantification unit that quantifies the pattern of the image, and the correction value calculating unit may calculate the correction value using the pattern of the image quantified by the image pattern quantification unit. With this, the image forming apparatus corrects the base value set on the basis of the image area ratio using a value corresponding to at least the pattern of the image, and adjusts the image process condition. Thus, it is possible to stably form a high-quality image.

The image pattern quantification unit may quantify the pattern of the image using frequency characteristics obtained by Fourier transform. With this, the image forming apparatus corrects the base value set on the basis of the image area ratio using a value calculated from frequency characteristics obtained by Fourier transform according to at least the pattern of the image while maintaining the balance between the processing time and the accuracy of correction, and adjusts the image process condition. Thus, it is possible to stably and relatively easily form a high-quality image.

The correction value calculated by the correction value calculating unit may vary depending on whether a linear image extending in a main scanning direction is included in the pattern of the image. With this, the image forming apparatus corrects the base value set on the basis of the image area ratio depending on whether there is a linear image extending in the main scanning direction in at least the pattern of the image, and adjusts the image process condition. Thus, it is possible to stably form a high-quality image.

The correction value calculated by the correction value calculating unit may vary depending on whether a linear image extending in a sub-scanning direction is included in the pattern of the image. With this, the image forming apparatus corrects the base value set on the basis of the image area ratio depending on whether there is a linear image extending in the sub-scanning direction in at least the pattern of the image, and adjusts the image process condition. Thus, it is possible to stably form a high-quality image.

The amount of correction of the correction value calculated by the correction value calculating unit may increase as the number of linear images extending in the main scanning direction and/or the sub-scanning direction in the pattern of the image increases. With this, the image forming apparatus corrects the base value set on the basis of the image area ratio according to at least the pattern of the image, increases the amount of correction as the number of linear images included in the pattern of the image increases, and adjusts the image process condition. Thus, it is possible to stably form a high-quality image.

The image forming apparatus may further include an area ratio calculating unit that calculates the area ratio of each of divisional images obtained by dividing the image in the sub-scanning direction. With this, the image forming apparatus corrects the base value set on the basis of the image area ratio according to at least the pattern of each of the images divided in the sub-scanning direction, and adjusts the image process condition. Thus, it is possible to stably form a high-quality image.

The correction value calculating unit may calculate the correction value such that the correction value is larger for an image an the leading end side among the divisional images obtained by dividing the image in the sub-scanning direction. With this, the image forming apparatus corrects the base value set on the basis of the image area ratio according to at least the pattern of each of the images divided in the sub-scanning direction, performs the correction such that the correction value for the image at the leading end in the sub-scanning direction increases, and adjusts the image process condition. Thus, it is possible to stably form a high-quality image.

In the image forming apparatus in which the image pattern quantification unit quantifies the pattern of the image using frequency characteristics obtained by Fourier transform, the image pattern quantification unit may divide each of the divisional images obtained by dividing the image in the sub-scanning direction by a power of 2 and quantify the pattern of the image using the frequency characteristics obtained by the Fourier transform. With this, the image forming apparatus corrects the base value set on the basis of the image area ratio with high accuracy by dividing an image by a division number suitable for Fourier transform with respect to each of the divisional images obtained by dividing the image in the sub-scanning direction using a value calculated from frequency characteristics obtained by Fourier transform according to at least the pattern of the image while maintaining the balance between the processing time and the accuracy of correction, and adjusts the image process condition. Thus, it is possible to stably and relatively easily form a high-quality image.

The correction value calculating unit may calculate the correction value according to temperature and/or humidity in an image formation environment. With this, the image forming apparatus corrects the base value set on the basis of the image area ratio according to at least the pattern of the image and environmental elements related to the temperature and/or humidity, and adjusts the image process condition. Thus, it is possible to stably form a high-quality image according to the environment.

The image forming apparatus may further include a plurality of image carriers and an intermediate transfer body to which images carried on the image carriers are transferred. With this, the tandem image forming apparatus corrects the base value set on the basis of the image area ratio according to at least the pattern of the image, and adjusts the image process condition. Thus, it is possible to stably form a high-quality image.

The image process condition may include a transfer current, and the image may be formed using the correction value related to the transfer current calculated by the correction value calculating unit. With this, the image forming apparatus corrects the base value related to the transfer current set on the basis of the image area ratio according to at least the pattern of the image, and adjusts the image process condition. Thus, it is possible to stably form a high-quality image.

In the image forming apparatus including a plurality of image carriers and an intermediate transfer body to which images carried on the image carriers are transferred, a condition for calculating the correction value related to the transfer current in transfer from the image carriers to the intermediate transfer body may be different from a condition for calculating the correction value related to the transfer current in transfer from the intermediate transfer body to a recording medium. With this, the image forming apparatus appropriately corrects the base values related to a primary transfer current and a secondary transfer current set on the basis of the image area ratio according to at least the pattern of the image in different conditions, and adjusts the image process condition. Thus, it is possible to stably form a high-quality image.

In the image forming apparatus including a plurality of image carriers and an intermediate transfer body to which images carried on the image carriers are transferred, a condition for calculating the correction value related to the transfer current in transfer from the image carriers to the intermediate transfer body may be different depending on the image carriers. With this, the image forming apparatus appropriately corrects the base value related to the primary transfer current set on the basis of the image area ratio according to at least the pattern of the image in different conditions for the plurality of image carriers, and adjusts the image process condition. Thus, it is possible to stably form a high-quality image.

The image process condition may include a transfer bias. The transfer bias may be adjusted using the correction value related to the transfer current calculated by the correction value calculating unit to form the image. With this, the image forming apparatus corrects the base value set on the basis of the image area ratio according to at least the pattern of the image, and adjusts the image process condition related to the transfer bias using the correction value related to the transfer current. Thus, it is possible to stably form a high-quality image.

According to the embodiment, the base value setting unit sets a base value of an image process condition on the basis of the area ratio of an image to be formed. The correction value calculating unit calculates a correction value obtained by correcting the base value set in the base value setting unit on the basis of at least the pattern of the image. The image is formed using the correction value calculated by the correction value calculating unit. By correcting the base value set on the basis of the image area ratio and adjusting the image process condition, it is possible to stably form a high-quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

an area ratio calculating unit that calculates at least one area ratio of two areas of divisional images among a plurality of areas of divisional images obtained by dividing an entirety of an image in a sub-scanning direction, the two areas of divisional images being divided from the entirety of the image such that the two areas of divisional images each include a complete length of the image along a main scanning direction;

a base value setting unit that sets a base value of an image process condition based on the at least one area ratio of the image to be formed; and a correction value calculating unit that calculates a correction value for correcting the base value based at least on a pattern of the image by estimating a ratio of solid images to linear images of the image according to an expression of:

$$\frac{\int_{k}^{\infty} F[f](k)\,dk}{\int_{k}^{\infty} F[f](k)\,dk + \int_{\frac{1}{L}}^{k} F[f](k)\,dk},$$

k being a frequency,

L being a width of the image divided by a number of divisions the entirety of the image is divided by, F[f](k) being a discrete function of the frequency k obtained by Fourier transform, wherein the image is formed based on the correction value calculated by the correction value calculating unit.

2. The image forming apparatus according to claim 1, wherein the correction value calculated by the correction value calculating unit varies depending on whether a linear image extending in the main scanning direction is included in the pattern of the image.

3. The image forming apparatus according to claim 1, wherein the correction value calculated by the correction value calculating unit varies depending on whether a linear image extending in the sub-scanning direction is included in the pattern of the image.

4. The image forming apparatus according to claim 1, wherein an amount of correction of the correction value calculated by the correction value calculating unit increases as linear images extending in either or both the main scanning direction and the sub-scanning direction in the pattern of the image increase.

5. The image forming apparatus according to claim 1, wherein the correction value calculating unit calculates the correction value such that the correction value is larger for an image on a leading end side among the divisional images.

6. The image forming apparatus according to claim 1, further comprising an image pattern quantification unit that divides each of the divisional images by a power of 2 and quantifies the pattern of the image based on a frequency characteristic obtained by Fourier transform.

7. The image forming apparatus according to claim 1, wherein the correction value calculating unit calculates the correction value according to either or both temperature and humidity in an image formation environment.

8. The image forming apparatus according to claim 1, further comprising:

a plurality of image carriers; and an intermediate transfer body to which images carried on the image carriers are transferred.

9. The image forming apparatus according to claim 1, wherein the image process condition includes a transfer current, and the image is formed based on the correction value related to the transfer current calculated by the correction value calculating unit.

10. The image forming apparatus according to claim 9, further comprising:

a plurality of image carriers; and an intermediate transfer body to which images carried on the image carriers are transferred, wherein a condition for calculating the correction value related to the transfer current in transfer from the image carriers to the intermediate transfer body is different from a condition for calculating the correction value related to the transfer current in transfer from the intermediate transfer body to a recording medium.

11. The image forming apparatus according to claim 9, further comprising:

a plurality of image carriers; and an intermediate transfer body to which images carried on the image carriers are transferred, wherein a condition for calculating the correction value related to the transfer current in transfer from the image carriers to the intermediate transfer body is different depending on the image carriers.

12. The image forming apparatus according to claim 1, wherein the image process condition includes a transfer bias, and the transfer bias is adjusted based on the correction value related to a transfer current calculated by the correction value calculating unit to form the image.

13. An image forming method comprising:

calculating, by an area ratio calculating unit, at least one area ratio of two areas of divisional images among a plurality of areas of divisional images obtained by dividing an entirety of the image in a sub-scanning direction, the two areas of divisional images being divided from the entirety of the image such that the two areas of divisional images each include a complete length of the image along a main scanning direction;

setting, by a base value setting unit, a base value of an image process condition based on the at least one area ratio of the image to be formed; and calculating, by a correction value calculating unit, a correction value for correcting the base value based at least on a pattern of the image by estimating a ratio of solid images to linear images of the image according to an expression of:

$$\frac{\int_{k}^{\infty} F[f](k)\,dk}{\int_{k}^{\infty} F[f](k)\,dk + \int_{\frac{1}{L}}^{k} F[f](k)\,dk},$$

k being a frequency,

L being a width of the image divided by a number of divisions the entirety of the image is divided by, F[f](k) being a discrete function of the frequency k obtained by Fourier transform, wherein the image is formed based on the correction value calculated at the calculating.

14. The image forming apparatus according to claim 1, wherein the area ratio is a coverage rate in a direction perpendicular to the main scanning direction.

15. An image forming apparatus comprising:

a base value setting unit that sets a first base value of an image process condition based on a first map and at least one area ratio of two areas of divisional images among a plurality of areas of divisional images, and sets a second base value of an image process condition based on a second map; and a correction value calculating unit that calculates a first correction value and a second correction value, the first correction value calculated for correcting the first base value based at least on a first pattern of the image by estimating a ratio of solid images to linear images of the first pattern, and the second correction value calculated for correcting the second base value based at least on a second pattern of the image by estimating a ratio of solid images to linear images of the second pattern, wherein each ratio of solid images to linear images is estimated according to an expression of:

$$\frac{\int_{k}^{\infty} F[f](k)\,dk}{\int_{k}^{\infty} F[f](k)\,dk + \int_{\frac{1}{L}}^{k} F[f](k)\,dk},$$

k being a frequency,

L being a width of the image divided by a number of divisions the entirety of the image is divided by, F[f](k) being a discrete function of the frequency k obtained by Fourier transform, wherein the plurality of divisional images are obtained by dividing an entirety of an image in a sub-scanning direction, wherein the two areas of divisional images are divided from the entirety of the image such that the two areas of divisional images include a complete length of the image along a main scanning direction, and wherein the image is formed based on the first correction value and the second correction value calculated by the correction value calculating unit.

16. The image forming apparatus according to claim 15, wherein the image process condition includes a first transfer current and a second transfer current, the first transfer current being based on the first correction value and the second transfer current being based on the second correction value, and wherein the first transfer current is applied to a primary transfer unit and the second transfer current is applied to a secondary transfer unit.

* * * * *